US012622363B2

(12) United States Patent
Zillmer

(10) Patent No.: US 12,622,363 B2
(45) Date of Patent: May 12, 2026

(54) SYSTEM AND METHOD FOR GROWING AND INSTALLING A PLANT

(71) Applicant: Ronald E. Zillmer, Merrillan, WI (US)

(72) Inventor: Ronald E. Zillmer, Merrillan, WI (US)

(73) Assignee: Legacy-Trees, LLC, Merrillan, WI (US)

( * ) Notice: Subject to any disclaimer, the term of this patent is extended or adjusted under 35 U.S.C. 154(b) by 0 days.

(21) Appl. No.: 18/133,996

(22) Filed: Apr. 12, 2023

(65) Prior Publication Data

US 2023/0320280 A1 Oct. 12, 2023

Related U.S. Application Data

(60) Provisional application No. 63/330,169, filed on Apr. 12, 2022.

(51) Int. Cl.
*A01G 9/02* (2018.01)
*A01G 23/04* (2006.01)

(52) U.S. Cl.
CPC .............. *A01G 9/02* (2013.01); *A01G 23/04* (2013.01); *A01G 9/0302* (2025.01)

(58) Field of Classification Search
CPC ..... A01G 9/02; A01G 2009/003; A01G 23/04
See application file for complete search history.

(56) References Cited

U.S. PATENT DOCUMENTS 4,889,390 A 12/1989 Campbell
5,311,700 A * 5/1994 Thomas ................. A01G 23/04
47/76
8,033,048 B2 * 10/2011 Whitcomb ............. A01G 9/026
47/32.7
10,356,985 B1 * 7/2019 Raymond ................ A01G 9/02
2005/0120645 A1 6/2005 Luckett
2006/0230677 A1 * 10/2006 Bonahoom .......... A01G 23/043
47/76
2008/0120906 A1 * 5/2008 Nottingham ........... A01G 23/04
47/65.5
2009/0001035 A1 1/2009 Mulholland et al.
(Continued)

FOREIGN PATENT DOCUMENTS

CN 201398344 Y * 2/2010
CN 105594486 A * 5/2016
(Continued)

OTHER PUBLICATIONS

International Search Report and Written Opinion mailed Dec. 17, 2025 and received in PCT/US2025/045410.

*Primary Examiner* — Monica L Perry
*Assistant Examiner* — Aaron M Rodziwicz
(74) *Attorney, Agent, or Firm* — Winthrop & Weinstine, P.A.

(57) ABSTRACT

Systems and methods for growing and installing a tree having the roots expand generally radially outward and substantially not down by a horizontal root system planter comprising a base structure and a wall. The horizontal root system planter encourages roots of a tree to grow radially outwardly and substantially not down. In addition to a horizontal root system planter, systems and methods include a tool for tree transporting, digging, and planting operations comprising a box and a blade. The blade is configured for breaking ground and also for supporting a horizontal root system planter.

20 Claims, 45 Drawing Sheets

(56)                    References Cited

U.S. PATENT DOCUMENTS

| | | | | |
|---|---|---|---|---|
| 2012/0011773 A1* | 1/2012 | Cross | ..................... | A01G 9/026 |
| | | | | 47/66.7 |
| 2012/0073195 A1* | 3/2012 | Crosby | ................... | A01G 9/02 |
| | | | | 47/66.7 |
| 2019/0200543 A1 | 7/2019 | Lapierre | | |
| 2020/0029505 A1* | 1/2020 | Riley | ...................... | A01G 9/02 |
| 2020/0154651 A1* | 5/2020 | Simpson | ............. | A01G 23/043 |
| 2020/0260655 A1* | 8/2020 | Sappenfield | ............. | A01G 9/02 |
| 2024/0268280 A1* | 8/2024 | Anthofer | ................. | A01G 9/02 |

FOREIGN PATENT DOCUMENTS

| | | | | | |
|---|---|---|---|---|---|
| CN | 106063431 | A | * | 11/2016 | |
| CN | 106718650 | A | * | 5/2017 | |
| CN | 107950237 | A | * | 4/2018 | |
| CN | 108513885 | A | * | 9/2018 | |
| CN | 210275089 | U | | 4/2020 | |
| CN | 111357604 | A | * | 7/2020 | |
| CN | 114521413 | A | * | 5/2022 | |
| CN | 114711050 | A | * | 7/2022 | |
| CN | 118370104 | A | * | 7/2024 | |
| CN | 118451950 | A | * | 8/2024 | |
| EP | 3338536 | A1 | * | 6/2018 | |
| EP | 4385318 | A1 | * | 6/2024 | ........... A01G 27/005 |
| ES | 1074627 | U | * | 5/2011 | ............... A01G 9/02 |
| FR | 2852782 | A1 | * | 10/2004 | ............... A01G 9/02 |
| GB | 2069805 | A | * | 9/1981 | ............... A01G 9/02 |
| JP | H0494958 | U | * | 8/1992 | |
| JP | 2018178390 | A | | 11/2018 | |
| KR | 20090001168 | U | * | 2/2009 | |
| KR | 20110007261 | U | * | 7/2011 | |
| KR | 200463803 | Y1 | * | 11/2012 | |
| KR | 101251988 | B1 | * | 4/2013 | |
| KR | 101298352 | B1 | * | 8/2013 | |
| KR | 20150002270 | U | * | 6/2016 | |
| KR | 101713488 | B1 | * | 2/2017 | |

* cited by examiner

60

60

100

SYSTEM AND METHOD FOR GROWING AND INSTALLING A PLANT

CROSS-REFERENCE TO RELATED APPLICATIONS

The present disclosure claims priority to Provisional Application No. 63/330,169, entitled System and Method for Growing and Installing a Plant, and filed Apr. 12, 2022, the content of which is hereby incorporated by reference herein in its entirety.

FIELD OF THE INVENTION

The present disclosure relates to novel and advantageous systems and methods for growing and installing a tree wherein the roots expand generally radially outward and substantially not down. More particularly, the present disclosure relates to a novel and advantageous horizontal root system planter comprising a base structure and a wall, wherein the horizontal root system planter encourages roots of a tree to grow generally radially outwardly and substantially not down. The present disclosure further relates to a tool for tree transporting, digging, and planting operations is provided. The tool may comprise a box and a blade. The blade may be configured for breaking ground and also for supporting a horizontal root system planter

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chestnut Blight, Dutch Elm Disease, and Emerald Ash Borer have devastated urban forests for over a century. It is expected that more diseases and insects will come in the future that will attack urban trees. Disease and insect pathogens are well known and publicized but an additional threat exists for urban trees. Deep planting, the type of planting encouraged by nursery production practices, crosses the lines of species in a manner that impacts all trees planted by humans. Nearly every urban tree planted since World War II suffers from improper planting depth and root system problems resulting from standard nursery production practices. Those traditional practices result in stem girdling roots and basal trunk rot when the tree trunk is placed too deep into the soil during the final planting in the landscape.

In nature, the primary structural roots of a tree radiate outwardly from the root flare in all directions like the spokes of a wheel. Roots are able to absorb oxygen if they are sufficiently close to the ground surface.

Traditional nursery production practices grow trees in containers optimized for shipping and handling. In such containers, roots are forced to grow generally downwardly because the containers are narrow and deep. This is at the expense of proper root orientation needed for long term survival. More specifically, the circling that occurs in standard nursery containers produces roots that are not positioned to properly colonize a planting site, with the majority of the traditional container produced root system dying following transplanting. These traditional systems of production and planting, sometimes referred to as containerization and deep planting, rely on the tree and its root system to recover from damage after being planted. This, combined with deep planting, causes many trees to struggle to establish new roots on the site. In many cases, the tree fails to thrive and dies.

Planting a tree comprises a plurality of steps—transporting the tree to a planting location, digging a hole for receiving the tree, depositing the tree in the hole, and backfilling the blade. This is often done using several tools. The tree may be transported to a planting location with a hoe or the like. A hole may be dug for receiving the tree using a shovel. The tree may be manually deposited in the hole. The hole may be backfilled with a shovel. This is a labor intensive and awkward process.

Thus, there is a need in the art for a system encourages this natural root development and delivers an undamaged root system that is ready to immediately colonize. There further is a need in the art for a tool configured to do each of transporting a plant, digging a hole for receiving the plant, depositing the plant in the hole, and backfilling the plant.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

A horizontal root system planter for receiving a plant is provided. The planter may comprise a base structure and a wall. The base structure has a length. The wall extends upwardly from the base structure and has a height that is less than half the length of the base structure. The base structure and the wall define a space for roots of the plant to grow. The planter encourages the roots to grow radially outwardly and not substantially downwardly.

In some embodiments, the wall extends along a perimeter of the base structure. Tie elements may be provided for creating corners along the wall. The wall may be removable affixed to the base structure.

In further embodiments, the base structure comprises a deck and support members. The deck may be slotted. In some embodiments, the base structure includes a base substructure and a frame, and the base substructure comprises a deck and support members. The frame may sit on the deck within the frame.

A method of planting a plant grown in a horizontal root system planter is provided. The method may comprise growing a plant in a horizontal system planter, transporting the plant in the planter, digging a hole, removing the wall from the planter, and setting the planter in the hole. The hole may be 6-12 inches deep and may be dug with a blade. The planter may be set in the hole using the blade. In some embodiments, the planter may be leveled, the hole may be filled with dirt, and the dirt may be covered with mulch. The horizontal root system planter may comprise a base structure and a wall. The base structure has a length. The wall extends upwardly from the base structure and has a height that is less than half the length of the base structure. The base structure and the wall define a space for roots of the plant to grow. The planter encourages the roots to grow radially outwardly and not substantially downwardly.

A tool for tree transporting, digging, and planting operations is provided. The tool may comprise a box and a blade. The box may comprise an attachment end, a blade end opposite the attachment end, and first and second sides, the first and second sides being opposite one another and perpendicular to the attachment end and the blade end. The blade may include a platform and a front end. The blade may extend from the blade end of the box.

The platform of the blade may be sized for receiving a horizontal root system planter. The blade may be configured for digging into ground. The box may be open. The attachment end may be configured for attachment to an attachment plate. The tool may be articulable between a first position wherein the blade is approximately vertical and a second position wherein the blade is approximately horizontal.

A method of growing a plant in a horizontal root system planter is provided. The method includes providing a horizontal root system planter comprising a base structure and a wall. The wall extends upwardly from the base structure. The base structure has a length and the wall has a height that is less than half of the length of the base structure. The base structure and the wall define a space for roots of the plant to grow. The planter encourages the roots to grow radially outwardly and not substantially downwardly. The method further comprises depositing a layer of dirt on the base structure, placing the plant centrally in the space, filling the space with dirt, and allowing the plant to grow for 12-24 months.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
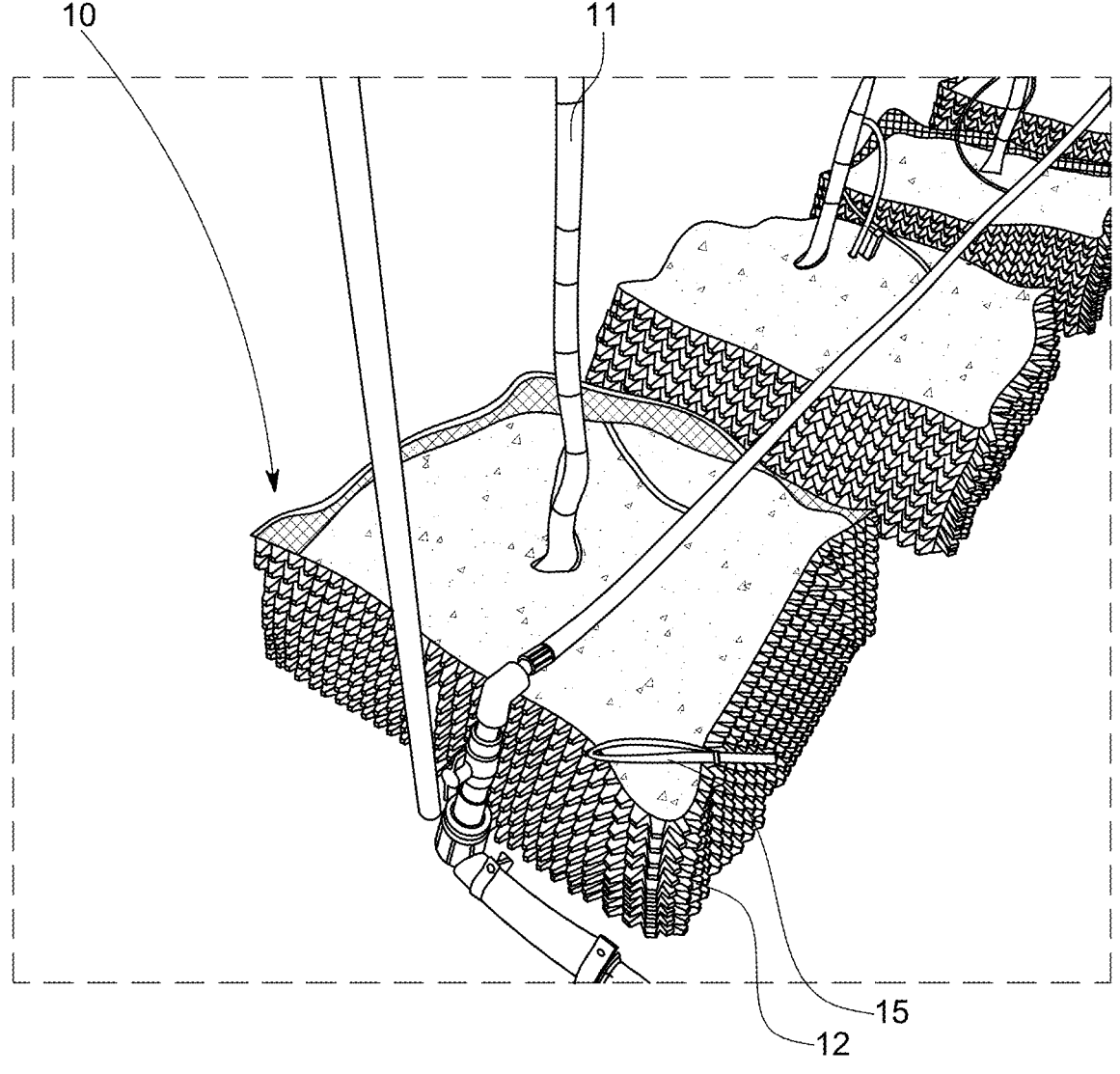
FIG. 1 illustrates an embodiment of a horizontal root system planter with a tree grown therein, in accordance with one embodiment.

The present disclosure relates to novel and advantageous systems and methods for growing and installing a tree wherein the roots expand generally radially outward and substantially not down. More particularly, the present disclosure relates to a novel and advantageous horizontal root system planter comprising a base structure and a wall, wherein the horizontal root system planter encourages roots of a tree to grow generally radially outwardly and substantially not down.

The present disclosure further relates to a novel and advantageous tool for digging and planting. Particularly, the present disclosure relates to a novel and advantageous tool capable of transporting a plant, digging a hole for receiving the plant, depositing the plant in the hole, and backfilling the hole. More particularly, the present disclosure relates to a novel and advantageous U-shaped blade capable of transporting a plant, digging a hole for receiving the plant, depositing the plant in the hole, and backfilling the plant.

Turning now to systems and methods for growing and installing a plant, such systems and methods produce trees in a manner that works in concert with a tree's root system. The disclosed system encourages growth of a tree's root system to mimic how tree roots grow in nature. In nature, the primary structural roots of a tree radiate from the root flare (or trunk flare) in all directions, similar to spokes of a wheel. The disclosed system encourages this natural root development and provides a substantially undamaged root system that is ready to immediately be planted and colonize.

Roots are able to absorb oxygen if they are sufficiently close to the ground surface. Unlike traditional nursery containerization and deep planting, trees grown and planted using the disclosed system and method have roots at a depth such that they can absorb oxygen. The disclosed system defines a root space for the roots to grow radially outwardly and substantially not down, with that root space being at a depth in the ground, when planted, that allows the roots to absorb oxygen.

While the system and method are described with respect to trees, it is to be appreciated that the system and method may be used for growing any plant for which radially outward growth of roots is advantageous.

Horizontal Root System Planter—The systems and methods use a horizontal root system planter to facilitate root growth radially outwardly and substantially not down. It is to be appreciated that there is some downward growth of the roots. However, the primary directionality of the growth is radially outward. In one embodiment, the horizontal root system planter comprises a base structure, or platform, that stays with the tree during nursery finishing and transport, and remains in the planting hole as a shell. For example, the base structure may be a wooden base structure and the wooden base structure may stay in place after planting and provide a biodegradable shell.

A plurality of embodiments of a horizontal root system planter are disclosed. For ease of reference, the core embodiments may be referred to as a first embodiment, a second embodiment, and a third embodiment. It is to be appreciated that such reference is intended as an identifier only and is not intended to denote anything about the respective embodiment. Further, as will be appreciated by one skilled in the art, certain aspects of the various embodiments may be interchangeable or may be further modified. Obvious modifications or variations are possible in light of the teachings herein. All such modifications and variations are within the scope of the present disclosure as determined by the appended claims when interpreted in accordance with the breadth they are fairly, legally, and equitably entitled.

In general, the horizontal root system planter may comprise a base structure, or platform, with an upper wall around a perimeter thereof. The upper wall may be a flexible wall. The upper wall may be supported by a frame. In some embodiments, the base structure may comprise a wooden structure. In various embodiments, the base structure may be slotted, solid, set as a grid, or other. In some embodiments, the flexible upper wall may comprise a reusable plastic wall, a biodegradable wall, or other. In one embodiment, the upper wall comprises a black plastic product such as that made by ROOTMAKER Products Company PO Box 14553 Huntsville, AL 35815-0553 (256) 882-3199 (256) 882-0423 FAX sales@rootmaker.com.

The horizontal root system planter defines a space for the roots to grow. More specifically, the horizontal root system planter defines a space for the roots to grow substantially radially outward and not downward. While specific exemplary dimensions are provided, these are for illustrative purposes only and generally are samples of sizes for larger trees. Smaller versions of the system may be used as appropriate for smaller sizes. In some embodiments, a series of planters may be provided that incrementally increase in size up to 8 feet or more in diameter. The entire system of planters may be coordinated to allow for moving trees from one size planter to a next larger planter as a tree grows. For example, a series of nesting planters may be provided.

FIG. 1 illustrates an embodiment of a horizontal root system planter 10 with a tree 12 grown therein. The horizontal root system planter embodiment shown in FIG. 1 is referred to as a first embodiment. The horizontal root system planter 10 includes a base structure (or platform) and a wall 12. The base structure may be wooden. The wall 12 may be flexible and may be plastic. The base structure supports the weight of the tree and soil surrounding the tree. The wall 12 maintains the tree and the soil surrounding the tree in position on the base structure.

Figure 2A:
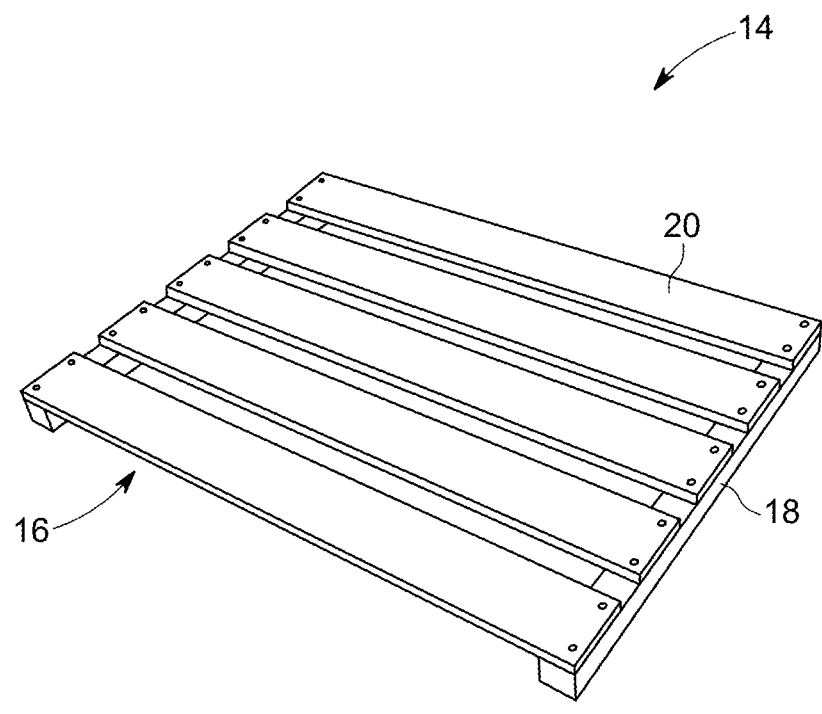
FIG. 2a illustrates a top perspective view of a base structure of a horizontal root system planter, in accordance with one embodiment.
Figure 2B:
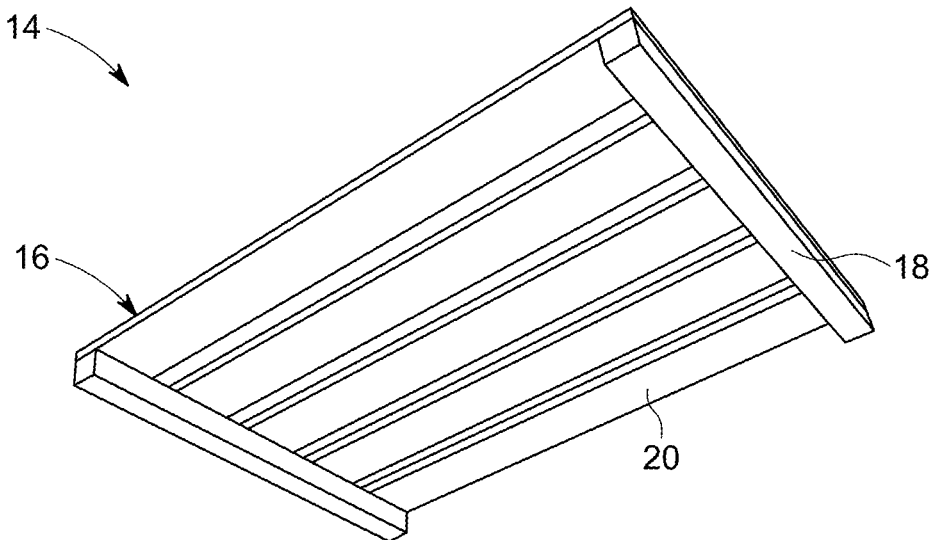
FIG. 2b illustrates a bottom perspective view of a base structure of a horizontal root system planter, in accordance with one embodiment.

FIGS. 2a and 2b show a top perspective view and a bottom perspective view of a base structure 14 of a horizontal root system planter, respectively, in accordance with the first embodiment. As shown, the base structure 14 may be configured substantially as a rectangle or square. Alternatively, other shapes of base structures may be used. The wall is sized and shaped to generally align with a perimeter of the base structure 14. In the embodiment shown in FIG. 1, tie elements 15 are used for creating and maintaining a corner geometry at four corners of the flexible wall 12 such that the flexible wall geometry aligns with the 2 dimensional shape of the base structure 14. The wall 12 may comprise a single piece of material or a plurality of pieces of material that are coupled to one another, for example via a tie element. It is to be appreciated that in some embodiments the wall may have a shape different than that of the base structure. For example, the wall may be configured as a circle with the base structure configured as a rectangle. The wall may be removed (and reused) before planting of the tree.

The horizontal root system planter encourages the roots of the tree to grow radially outwardly and not substantially downwardly. The planter thus may be sized and shaped to facilitate such growth. For example, the planter may have a depth (measured from the top of the wall to the platform) of approximately 6-12 inches and a width (measured from one side of the wall to an opposite wide of the wall) of at least about 2-2.5 feet. Treated burlap may be used to cover the platform to hold soil and prevent the roots from escaping out the bottom of the platform.

Figure 3A:
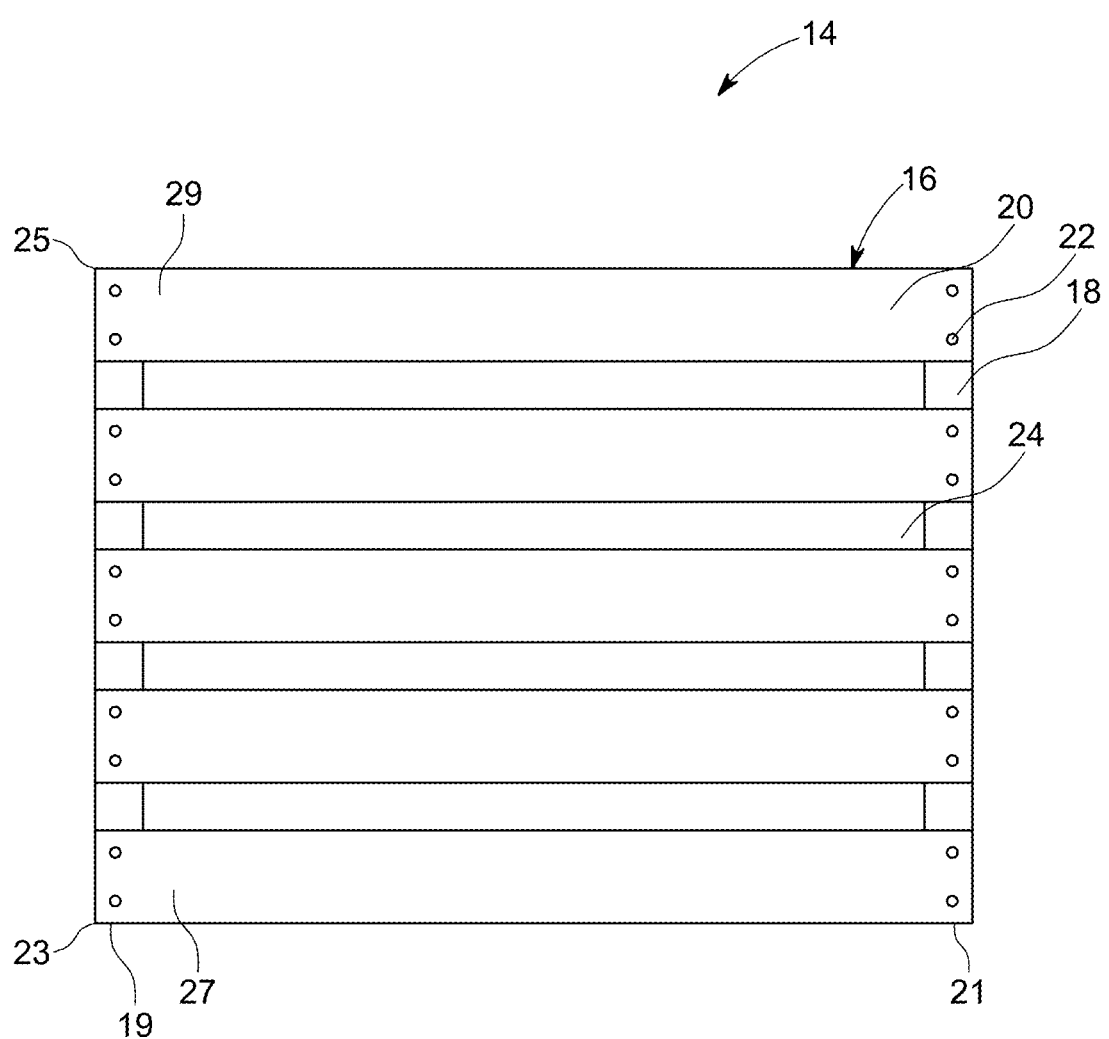
FIG. 3a illustrates a top view of a base structure of a horizontal root system planter, in accordance with one embodiment.
Figure 3B:
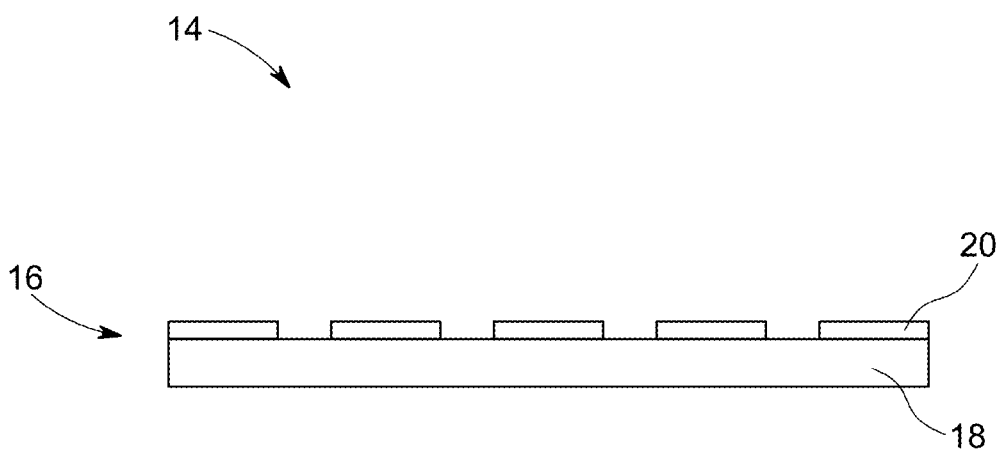
FIG. 3b illustrates a side view of a base structure of a horizontal root system planter, in accordance with one embodiment.
Figure 3C:
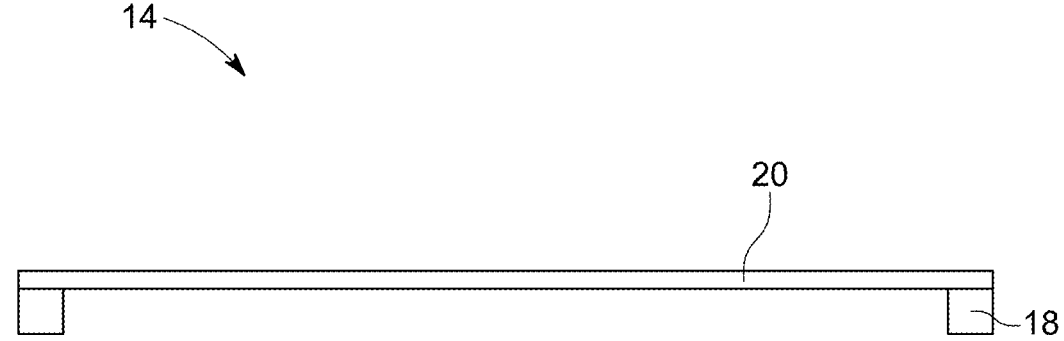
FIG. 3c illustrates an end view of the wooden base structure of a horizontal root system planter, in accordance with one embodiment.
Figure 3D:
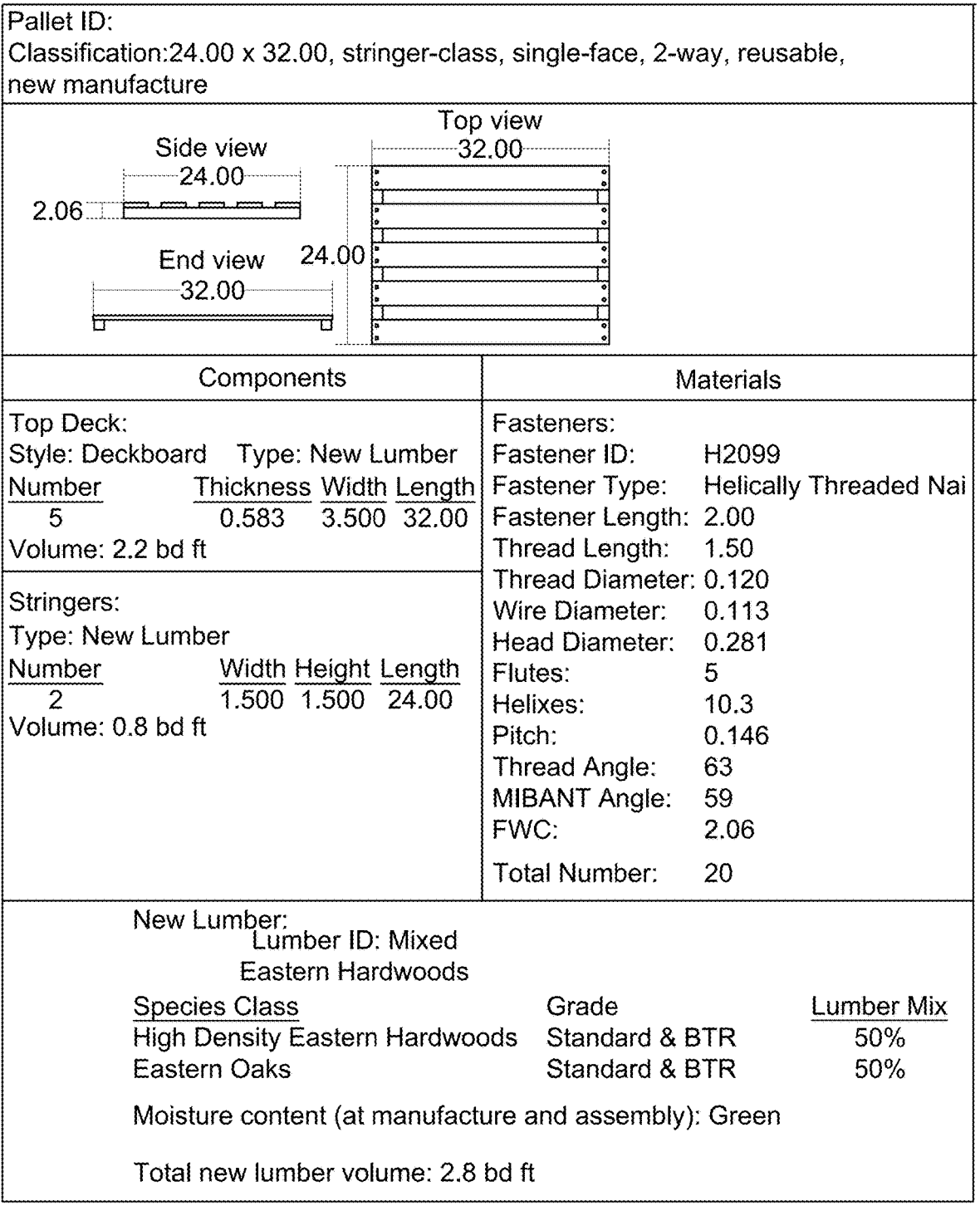
FIG. 3d sets forth the specifications of a base structure horizontal root system planter, in accordance with one embodiment.
Figure 4:
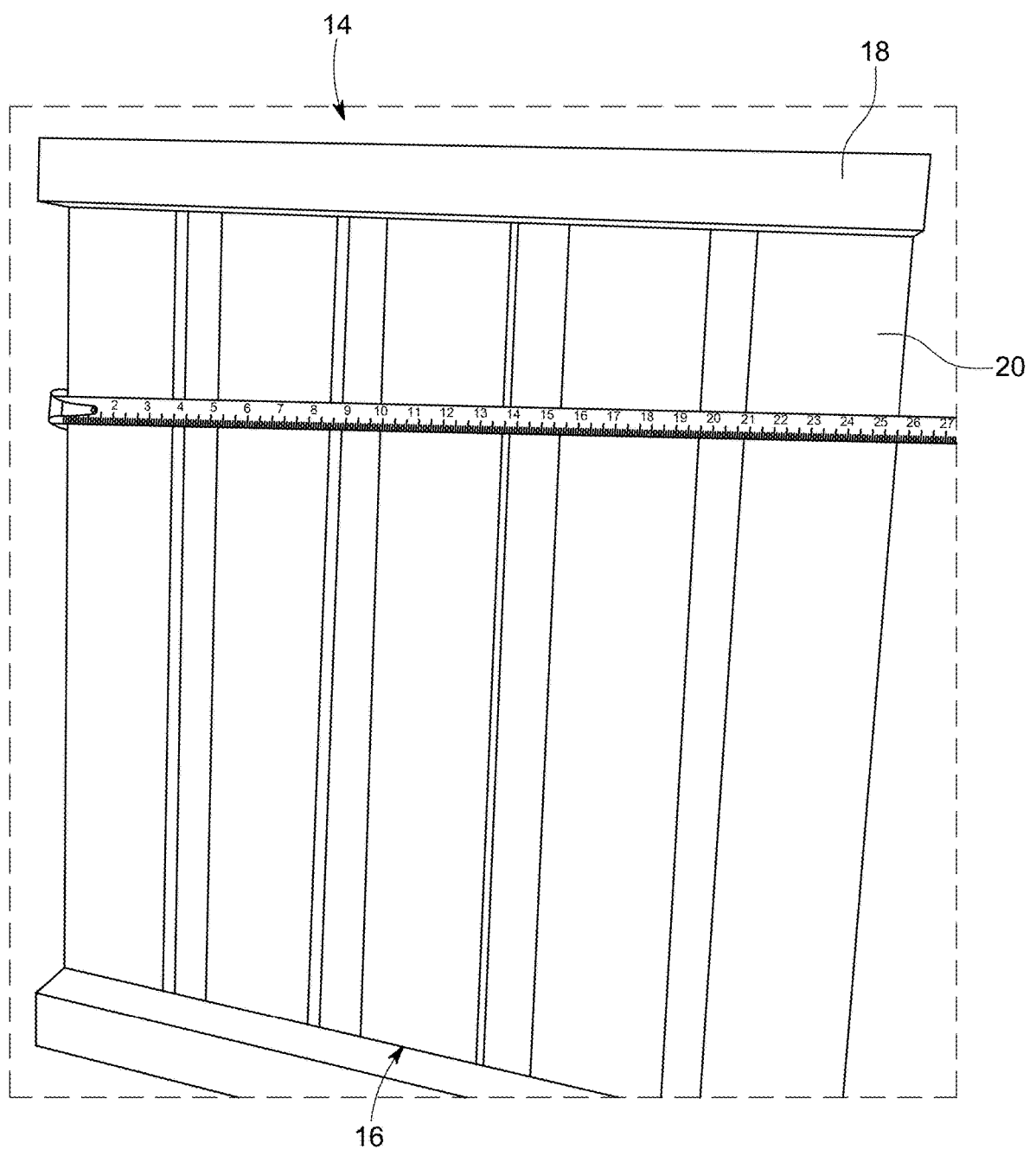
FIG. 4 illustrates an alternative bottom perspective view of a base structure such as shown in FIGS. 2a and 2b.

FIG. 3a illustrates a top view, FIG. 3b illustrates a side view, and FIG. 3c illustrates an end view of the base structure 14 shown in FIGS. 2a and 2b. FIG. 3d sets forth the specifications of such a base structure, in one embodiment. FIG. 4 illustrates an alternative bottom perspective view of a base structure such as shown in FIGS. 2a and 2b.

As shown, the base structure 14 comprises a top deck 16 and one or more support pieces 18 (or stringers). For example, the base structure may include first and second support pieces 18 with a top deck 16 comprising series of slats 20, for example five slats, provided thereover. The deck 16 may be fixed to the support pieces 20 using helically threaded nails 22. In general, however, the deck 16 may be fixed to the support pieces 20 in any suitable manner including, for example, an adhesive, nails, screws, or other. In the embodiment shown, the support pieces 18 are end pieces and are positioned with one support piece extending along a first end 19 of the slats 20 and the other support piece extending along a second end 21 of the slats 20. Similarly, the slats 20 are provided starting at a first end 23 of the support pieces 18 and terminating at the second end 25 of the support pieces 18. The slats 20 may be provided with openings 24 therebetween. The openings 24 may be uniform or may have different sizes. In alternative embodiments, the slats 20 may extend beyond the support pieces 18 and/or the support pieces 18 may extend beyond the slats 20. In yet other embodiments, a solid deck 16 may be used. In some embodiments, no support pieces may be used. The deck 16 and the support pieces 18 may comprise the same material or may comprise different materials. In some embodiments, the deck and support pieces may comprise lumber such as a mix of high density eastern hardwoods and eastern oaks.

As shown in FIGS. 3a-3d, the base structure 14 may have, for example, a width of 32 inches, a length of 24 inches, and a height of 2.06 inches. The height may be made up of support pieces 18 having a height of 1.5 inches and slats 20 having a height of 0.56 inches. The slats 20 may have lengths of 32 inches (extending fully between the two support pieces 18), widths of 3.5 inches, and may be positioned with a 1.63 inch space 24 between adjacent slats 20. The support pieces 18 may have lengths of 24 inches (extending fully between end slats 27 and 29), widths of 1.5 inches, and heights of 1.5 inches. It is to be appreciated that all dimensions are exemplary only.

The horizontal root system planters 10 may include a base structure 14 and a wall 12. In some embodiments, the base structure 14 may be wooden. The wooden base structure supports the weight of the tree and soil surrounding the tree. In some embodiments, the wall 12 may be a flexible plastic wall. The plastic wall maintains the tree and the soil surrounding the tree in position within the horizontal root system planter.

Figure 5A:
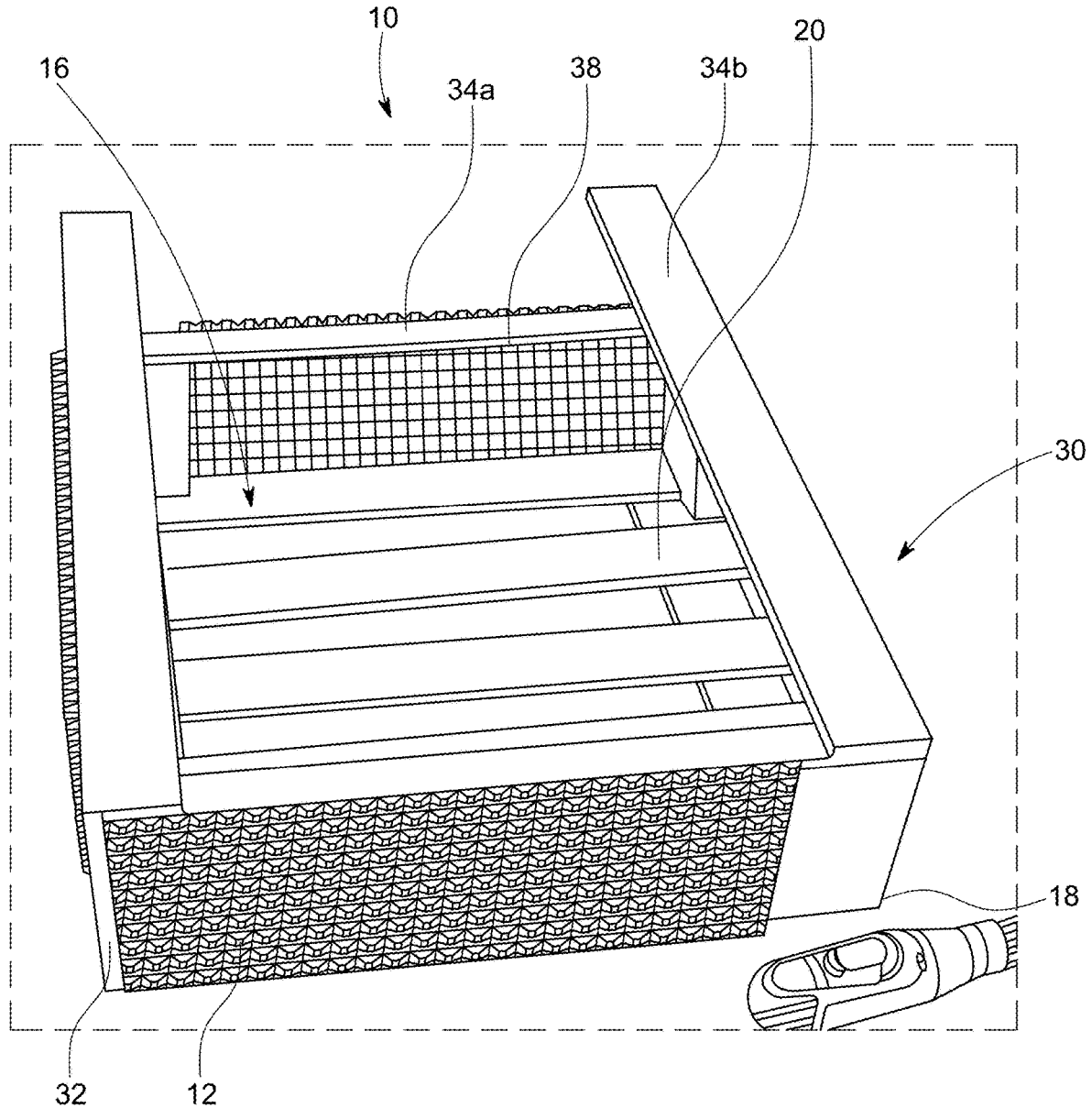
FIG. 5a illustrates a top perspective view of a horizontal root system planter, in accordance with one embodiment.
Figure 5B:
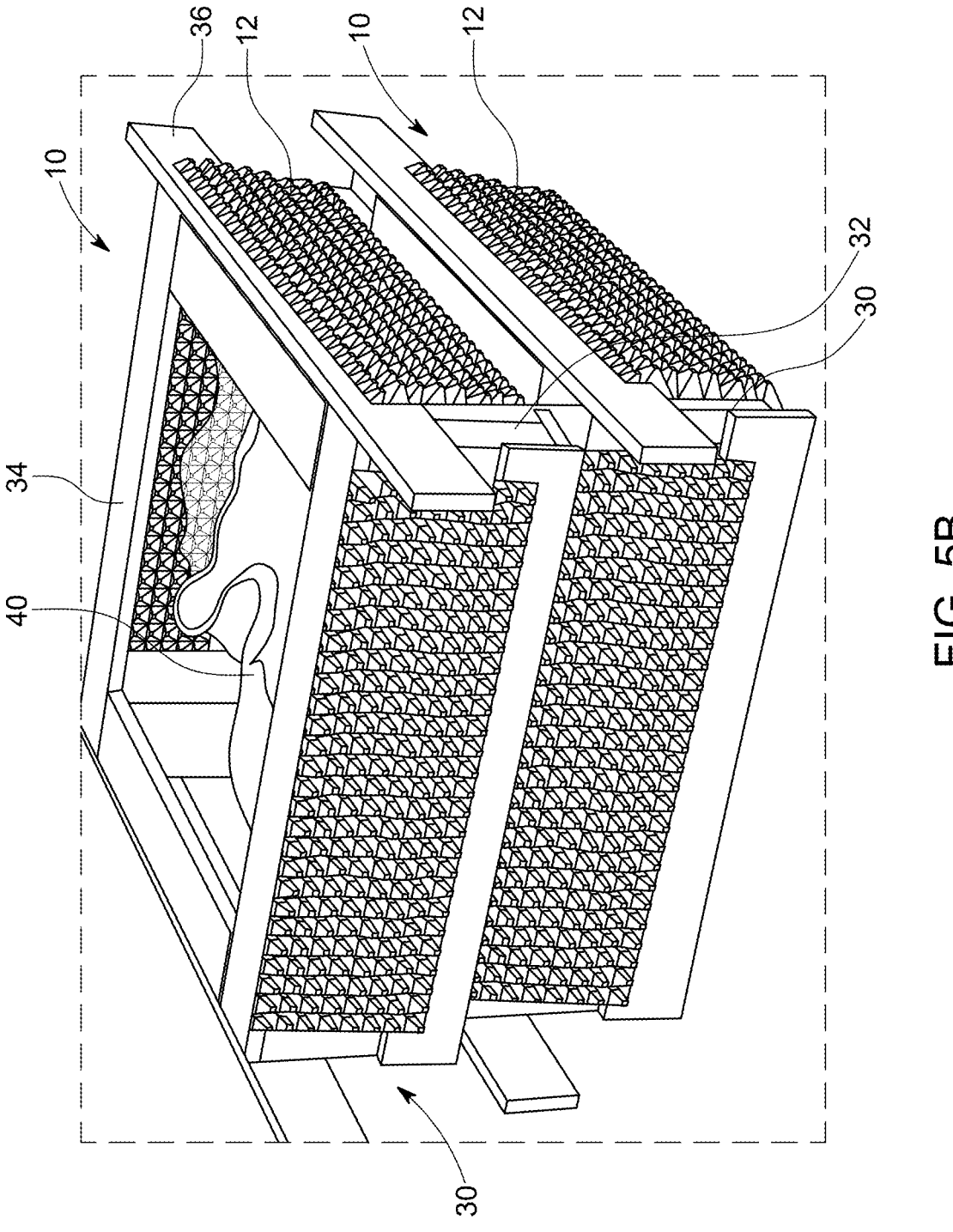
FIG. 5b illustrates a side perspective view of two stacked horizontal root system planters, in accordance with one embodiment.

FIG. 5a illustrates a top perspective view of a horizontal root system planter 10, in accordance with the second embodiment. FIG. 5b illustrates a side perspective view of two stacked horizontal root system planters 10, in accordance with the second embodiment.

In the embodiment of FIGS. 5a and 5b, the base structure 14 includes one or more support pieces 18, a deck 16, and an upwardly extending frame 30 for supporting a plastic wall 12. The support pieces 18 and deck 16 may be referred to as a base substructure. The upwardly extending frame may mirror the 2 dimensional shape of the base structure. The flexible wall may be fixed to the upwardly extending frame. In some embodiments, the flexible wall may be removable fixed to the upwardly extending frame.

The deck 16 may comprise a series of slats 20. In an embodiment comprising first and second support pieces 18, the deck 16 may extend between the support pieces 18 or may extend beyond the support pieces 18. Similarly, the support pieces 18 may extend beyond the deck 16 or may coterminate with the deck 16. The frame 30 may comprise one or more vertically extending posts 32 and one or more upper members 34. For example, the frame 30 may comprise four vertically extending corner posts 32 and four upper members 34. The posts 32 and upper members 34 coordinate to form windows 38 along each side of the base structure 14. The four upper members 34 each extend along a side of the platform. One or more of the upper members 34 may extend beyond a perimeter of the deck 16. The extension of the upper members 34 beyond the deck may be referred to has a handling portion. The handling portion may assist in handling of the horizontal root system planter 10.

Figure 6A:
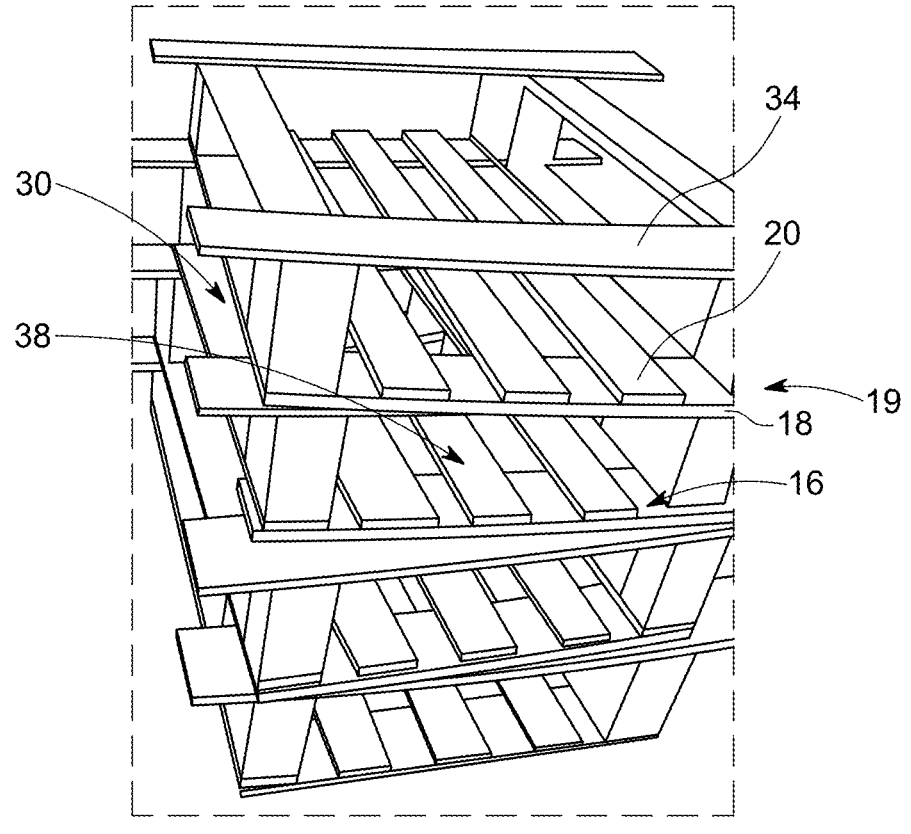
FIG. 6a illustrates a substantially planar base substructure with a frame built thereupon to form the base structure of a horizontal root system planter, in accordance with one embodiment.

It is to be appreciated that FIGS. 5a and 5b illustrate alternative examples of a horizontal root system planter 10, in accordance with the second embodiment. In the embodiment of FIG. 5a, two narrow upper members 34a are provided opposite one another and two wide upper members 34b are provided opposite one another, perpendicular to the two narrow upper members 34a. The two wide upper members 34b extend beyond the corner posts 32 on at least one end of the frame 30. In the embodiment of FIG. 5b, four upper members 34 are provided and two laterally extending members 36 are provided along opposite sides of the frame 30. The laterally extending members 36 are perpendicular to the upper members and are provided on the outside of the frame. The laterally extending members 36 extend beyond the corner posts 32. FIG. 6a illustrates a variation of FIG. 5a wherein four upper members 34 having approximately even widths are provided with two of the upper members 34 extending beyond the corner posts 32.

As can be seen in FIG. 5b, a piece of material 40 may be provided along the deck of the base structure 14 for aiding in keeping dirt within the platform.

As discussed, the horizontal root system planter may comprise a base structure (or platform) and a wall. The wall may comprise one or more panels. In some embodiments, the panels may include a plurality of pockets engineered into the panels. The panels may formed of plastic such as RootMaker plastic. The pockets may be configured to trap tree roots therein. Each pocket may have a hole for receiving the root tip as the plant grows. Growth of the root tip grows through the hole leads to desiccation and death of the growing root tip. When death of the root occurs, the root is stimulated to produce lateral roots behind the dead root tip. This results in significantly more root development in the horizontal root system planter with the root development being positioned to grow out of the horizontal root system planter following side removal (described more fully below) and planting. This is in contrast to the circling of roots that occurs in standard nursery container growth systems. In the traditional narrow, deep containers, roots are produced that are not positioned to properly colonize the site with the majority of the traditional container produced root system dying following transplanting into land.

In various embodiments, the wall piece may be a unitary piece extending around or within a perimeter of the base structure, may be a plurality of pieces extending substantially around or within a perimeter of the base structure, may be a plurality of pieces extending within portions of a frame (such as windows) of the base structure, or other.

Figure 6B:
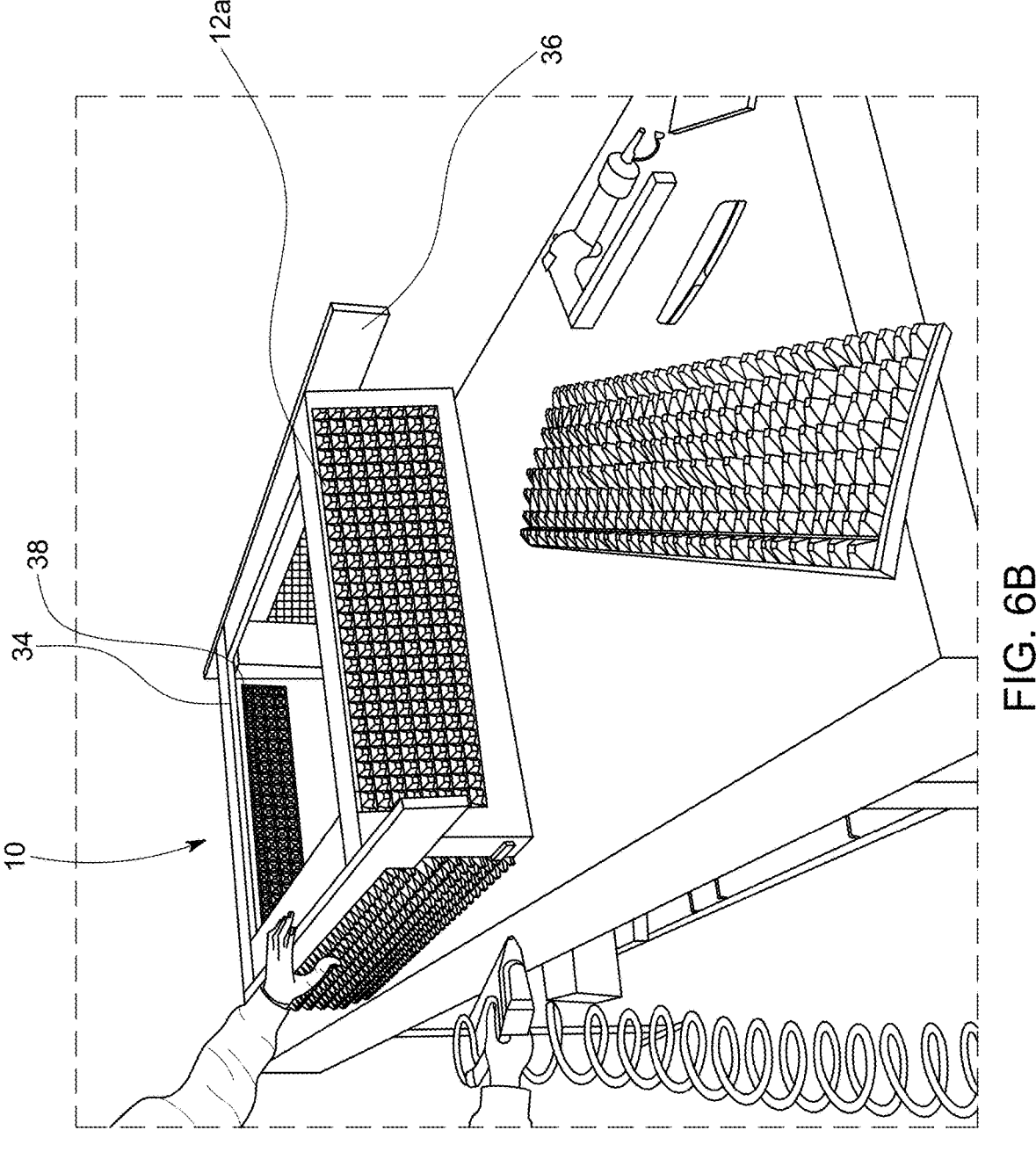
FIG. 6b illustrates a horizontal root system planter, in accordance with one embodiment.

FIGS. 6a and 6b illustrate construction of the horizontal root system planter shown in FIGS. 5a and 5b. FIG. 6a illustrates a substantially planar base substructure 19 with a frame 30 built thereupon to form the base structure 14. The base substructure 19 comprises a support pieces 18 and a deck 16. The deck 16 includes slats 20. As shown in FIG. 6b, the frame 30 may comprise corner posts 32 and upper members 34 spaced above and generally parallel with the base substructure 19, forming windows 38 along each side of the horizontal root system planter 10. As shown in FIG. 6b, wall pieces 12a are put in place over the windows 38. The wall pieces may be put on the outside of the frame, as shown, on the inside of the frame, or within the windows.

Figure 6C:
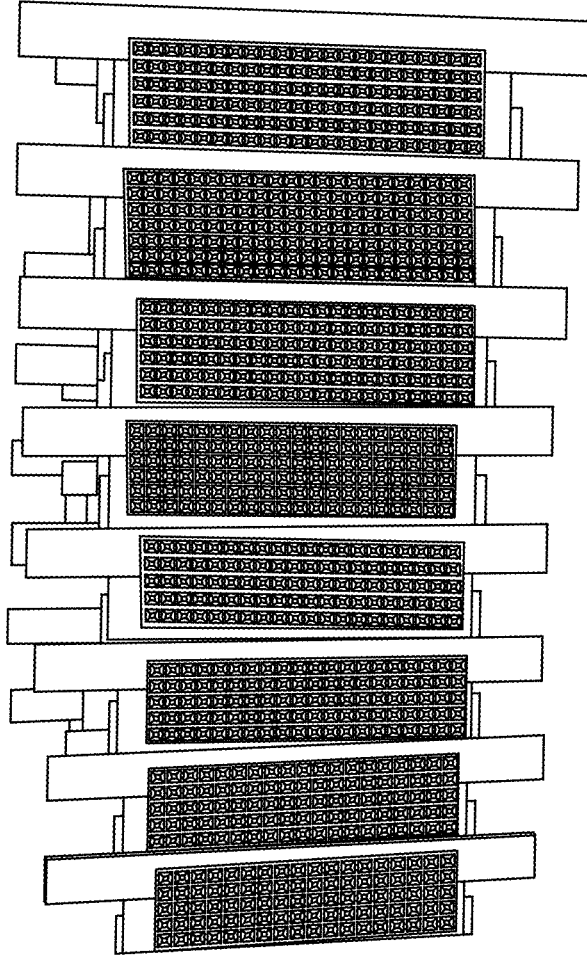
FIG. 6c illustrates a stack of horizontal root system planters including laterally extending members, in accordance with one embodiment.
Figure 6D:
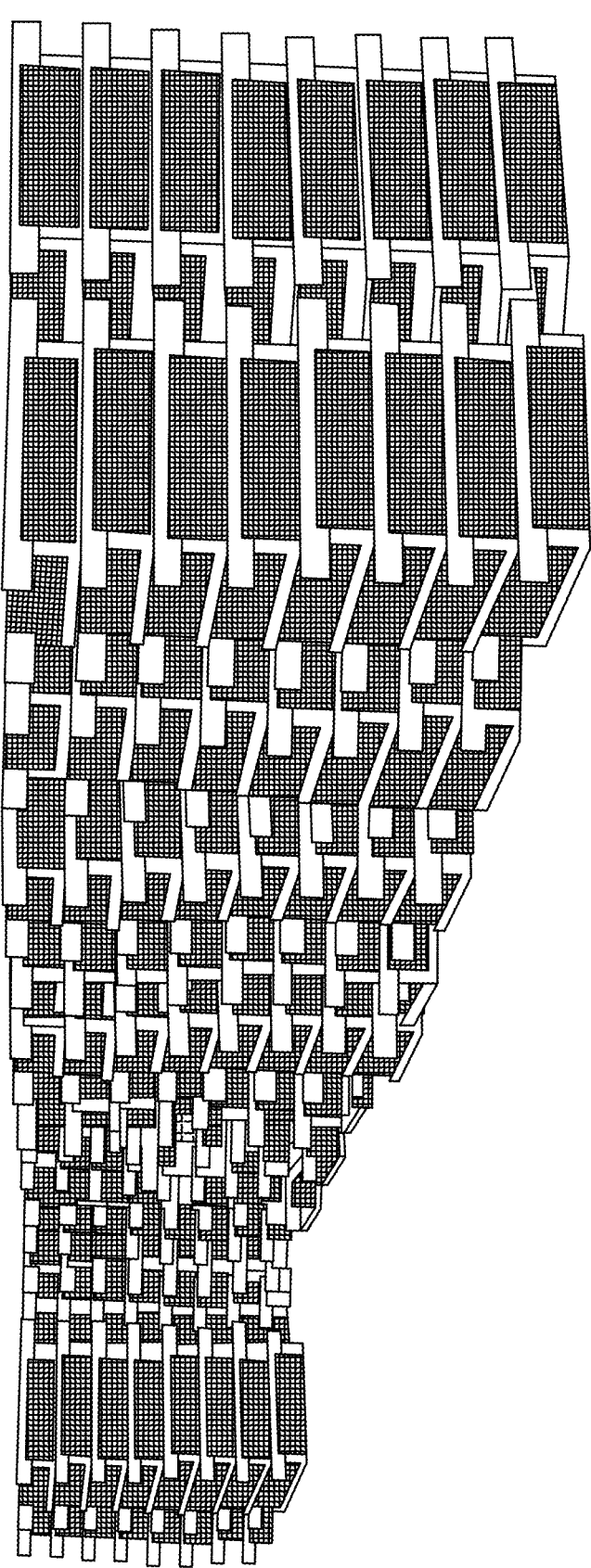
FIG. 6d illustrates a plurality of stacks of horizontal root system planters, in accordance with one embodiment.

The upper members may terminate at the posts or may extend beyond the posts to operate as carrying members. Alternatively, laterally extending members may be provided to operate as carrying members. FIG. 6c illustrates a stack of horizontal root system planters including laterally extending members that can be used to pick up and carry the horizontal root system planter. Stacking of the horizontal root system planters may be useful, for example, for shipping. FIG. 6d illustrates a plurality of stacks of horizontal root system planters.

Figure 7A:
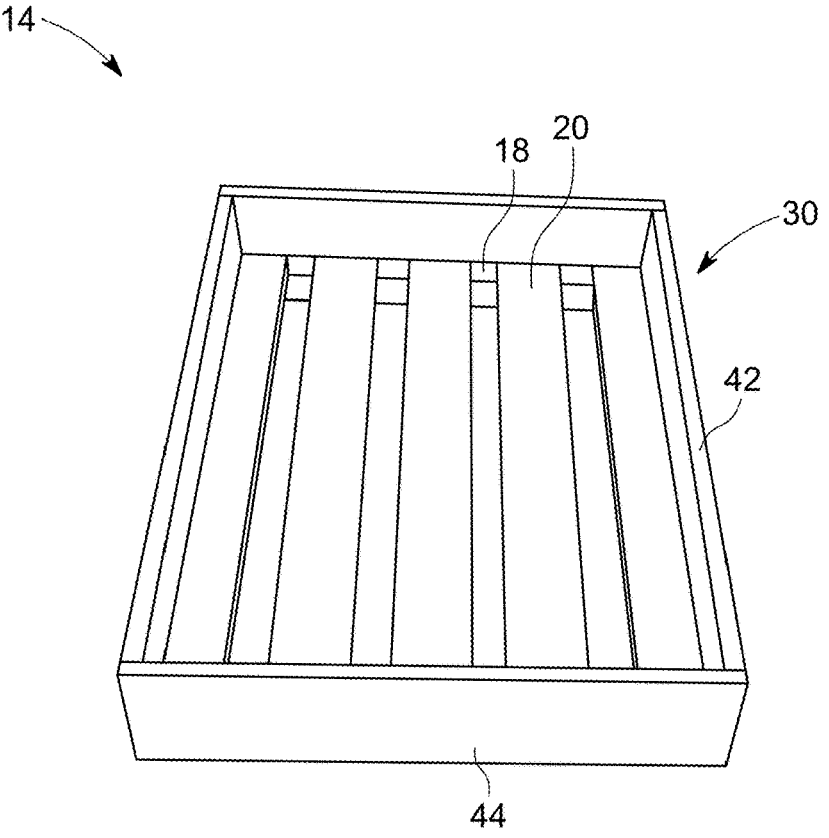
FIG. 7a illustrates a top perspective view of a base structure of a horizontal root system planter, in accordance with one embodiment.
Figure 7B:
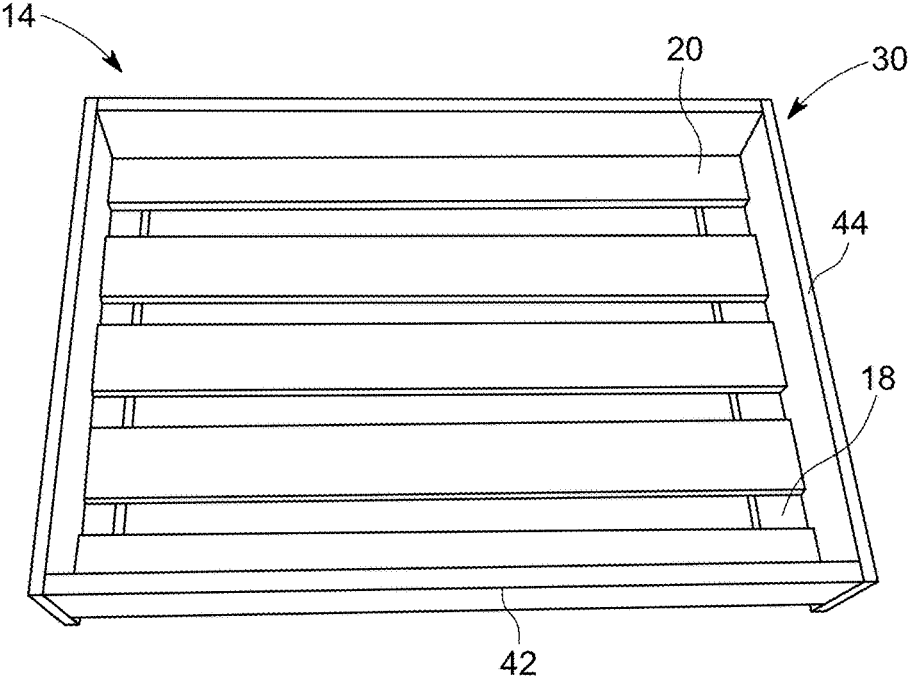
FIG. 7b illustrates a top perspective view of a base structure of a horizontal root system planter, in accordance with one embodiment.
Figure 7C:
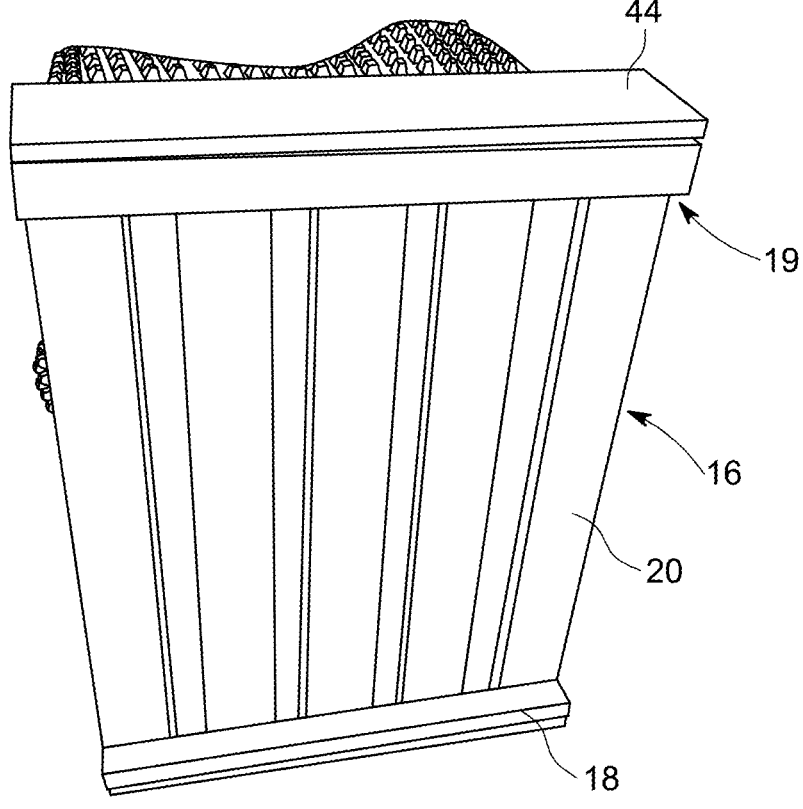
FIG. 7c illustrates a bottom perspective view of a base structure of a horizontal root system planter, in accordance with one embodiment.

FIGS. 7a, 7b, and 7c illustrate two top perspective views and a bottom perspective view of a base structure 14 of a horizontal root system planter 10, respectively, in accordance with the third embodiment. The base structure 14 includes a base substructure 19 and a frame 30 (or lip) generally around a periphery of the base substructure 16. The base substructure 19 includes support pieces 18 and a deck 16. The deck 16 may comprise a plurality of slats 20, optionally with spaces 24 therebetween. The frame 30 of the third embodiment is configured to assist in holding the wall in place when the horizontal root system planter is formed. For example, the wall may be placed on the deck 16 within the frame 30. The frame 30 may be any suitable height but is generally less than the height of the wall. In some embodiments, the frame 30 has a height that is less than ½ the height of the wall or a height that is less than ¼ the height of the wall.

In one example of the third embodiment, the base substructure 19 may be rectangular with a width of about 32 inches, a length of about 24 inches, and a height of about 2 inches. A frame 30 formed of side pieces 42 and end pieces 44 is provided associated with the base substructure. In some examples, the side pieces 42 and/or the end pieces 44 may be extended over the sides of the deck 16. In some examples, the side pieces 42 and/or the end pieces 44 may extend over the sides of the deck 16 and the support pieces 18. In other embodiments, the side pieces 42 and/or the end pieces 44 may be built on top of the deck 16 or may extend over only a portion of the deck 16 and/or the support pieces 18. The frame side pieces 42 may comprise 32"×3.5"×0.75" boards and the frame end pieces 44 may comprise 24"×5.5"×0.75" boards. The side pieces 42 and end pieces 44 together form a frame 30 (or lip) above the platform base such that the frame 30 can support a wall provided therein or thereabout. The frame 30 may be, for example, 3.5" in height. In general, the wall may have a height that is less than about half the width or the length of the base structure. For example, the wall may have a height of approximately 6-12 inches. In one embodiment, the wall has a height of about 11 inches and rests inside the frame formed by the end pieces and side pieces. The frame end pieces 44 and/or the frame side pieces 42 may be wooden boards.

Alternative embodiments to the horizontal root system planter are envisioned. In general, each embodiment includes a base structure platform, such as a wooden base structure platform, and a wall. The base structure platform is used to finish the plant above ground and provides a transport vessel for the root system. The wall assists in keeping the tree and dirt around the tree in the horizontal root system planter. The final use of the platform is to anchor the plant in the planting hole (described below). During above-ground growth, the plant's root system becomes embedded in the wood base structure. This makes the base structure part of the plant system at planting. The base structure can stay with the plant after planting to provide support. In general, it may be configured to biodegrade over a period of, for example, five years, at which time the plant no longer needs the support it provided in the nursery and during establishment in the ground.

Figure 8A:
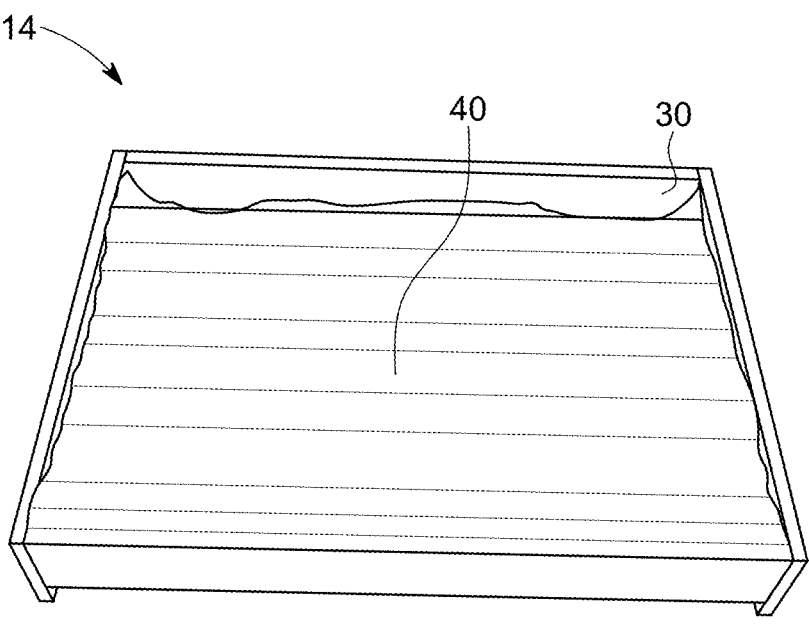
FIG. 8a illustrates a base structure including a base substructure and frame, in accordance with one embodiment.
Figure 8B:
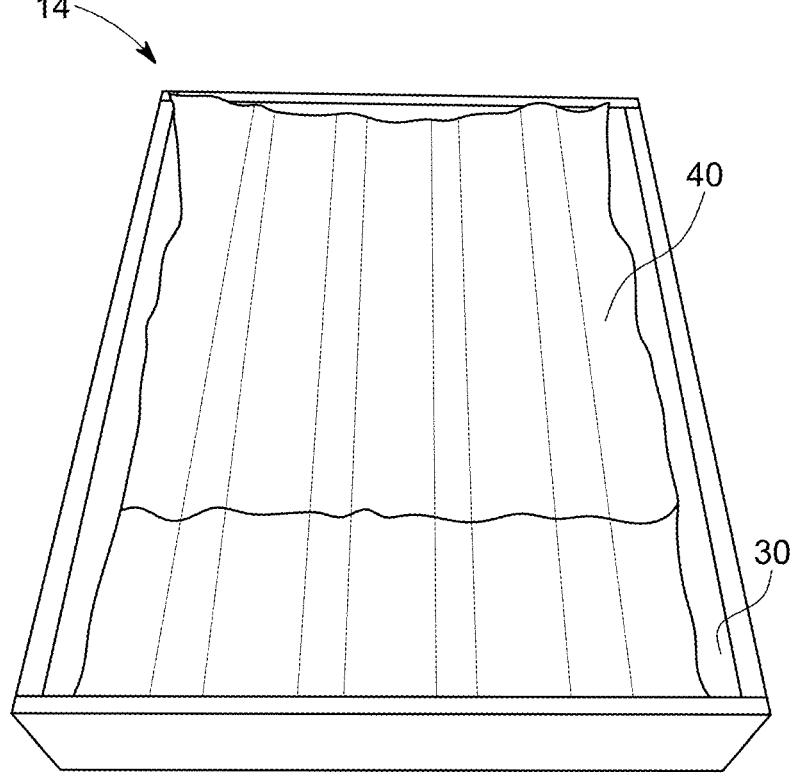
FIG. 8b illustrates a base structure including a base substructure and frame, in accordance with one embodiment.

FIGS. 8*a* and 8*b* illustrate a base structure 14, including a base substructure and frame 30, in accordance with the third embodiment. As shown, a covering 40, for example a burlap covering, may be provided on the deck of the base substructure within the frame 30. The burlap covering 40 assists in retaining dirt in the horizontal root system planter.

Figure 9A:
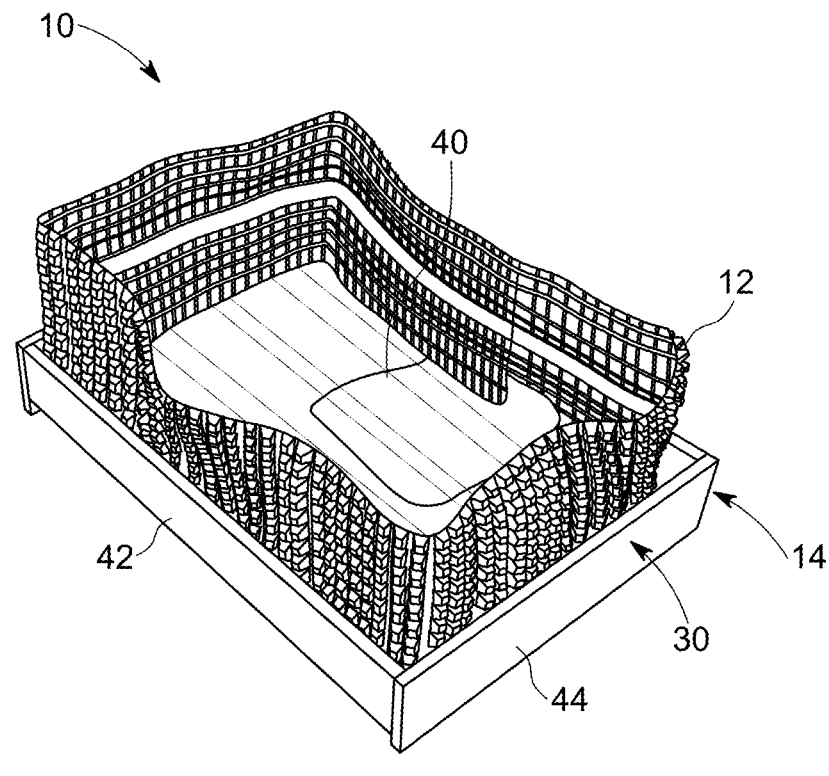
FIG. 9a illustrates a top perspective view of a horizontal root system planter, in accordance with one embodiment.
Figure 9B:
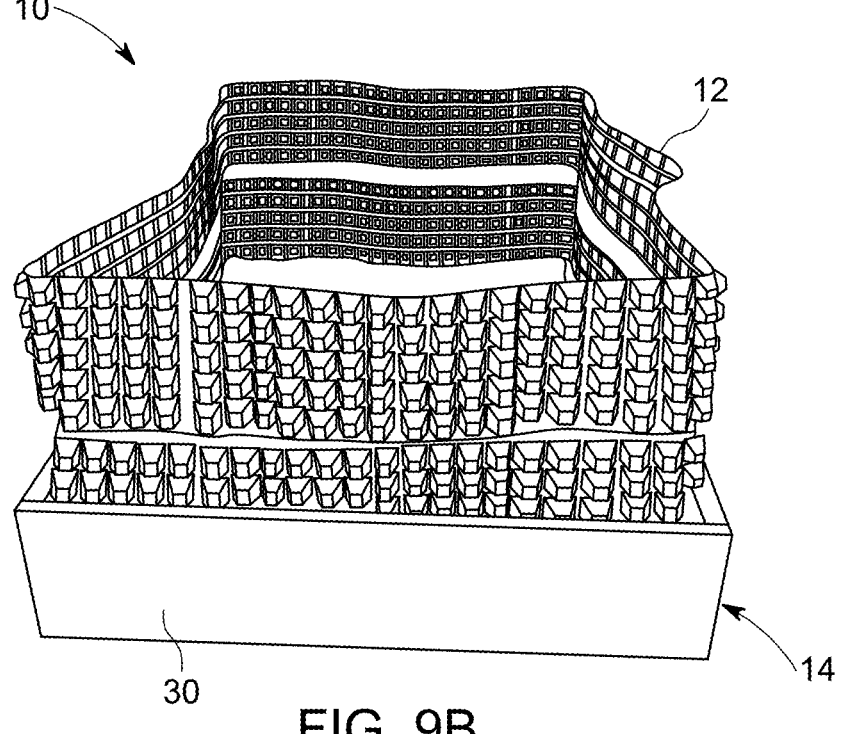
FIG. 9b illustrates a side perspective view of a horizontal root system planter, in accordance with one embodiment.
Figure 9C:
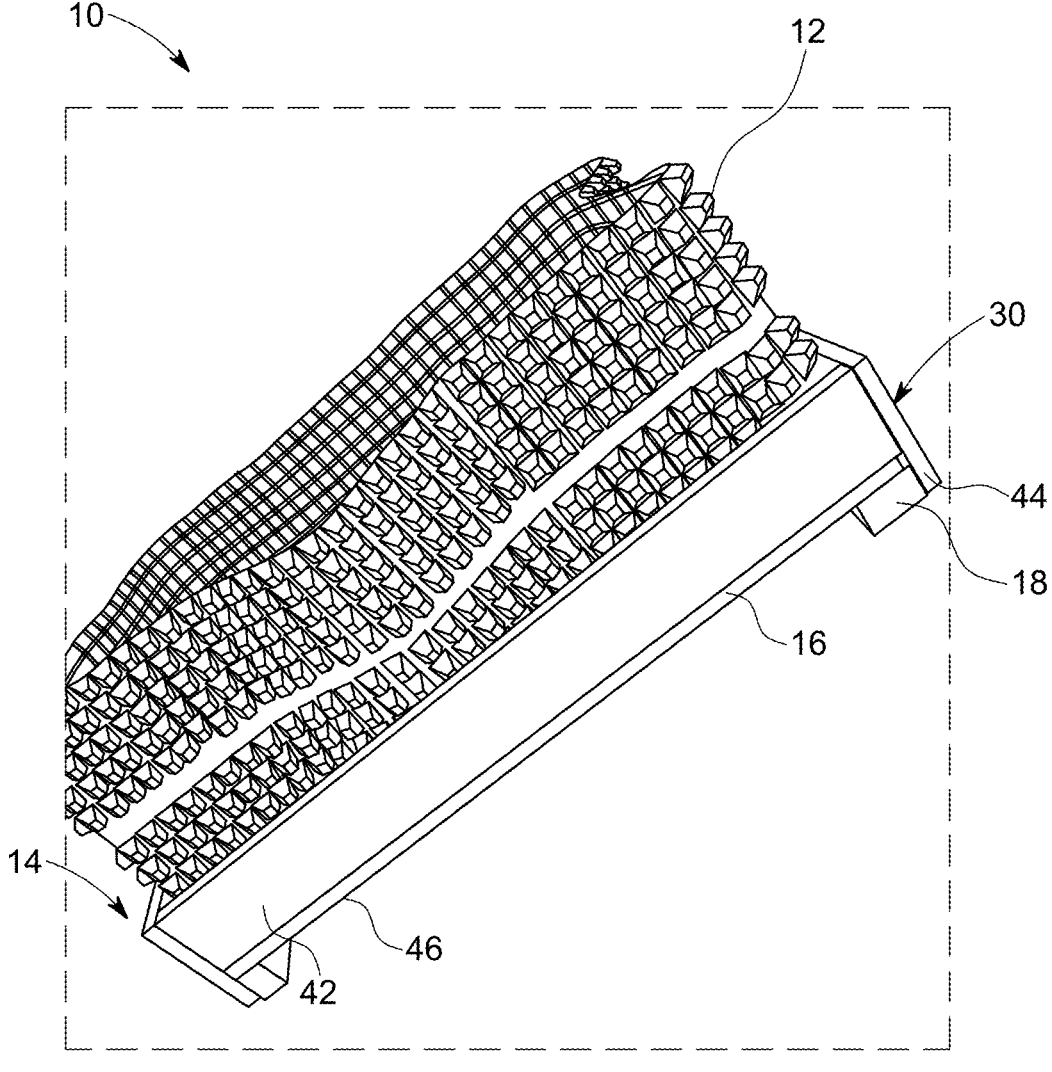
FIG. 9c illustrates a side perspective view of a horizontal root system planter, in accordance with one embodiment.
Figure 9D:
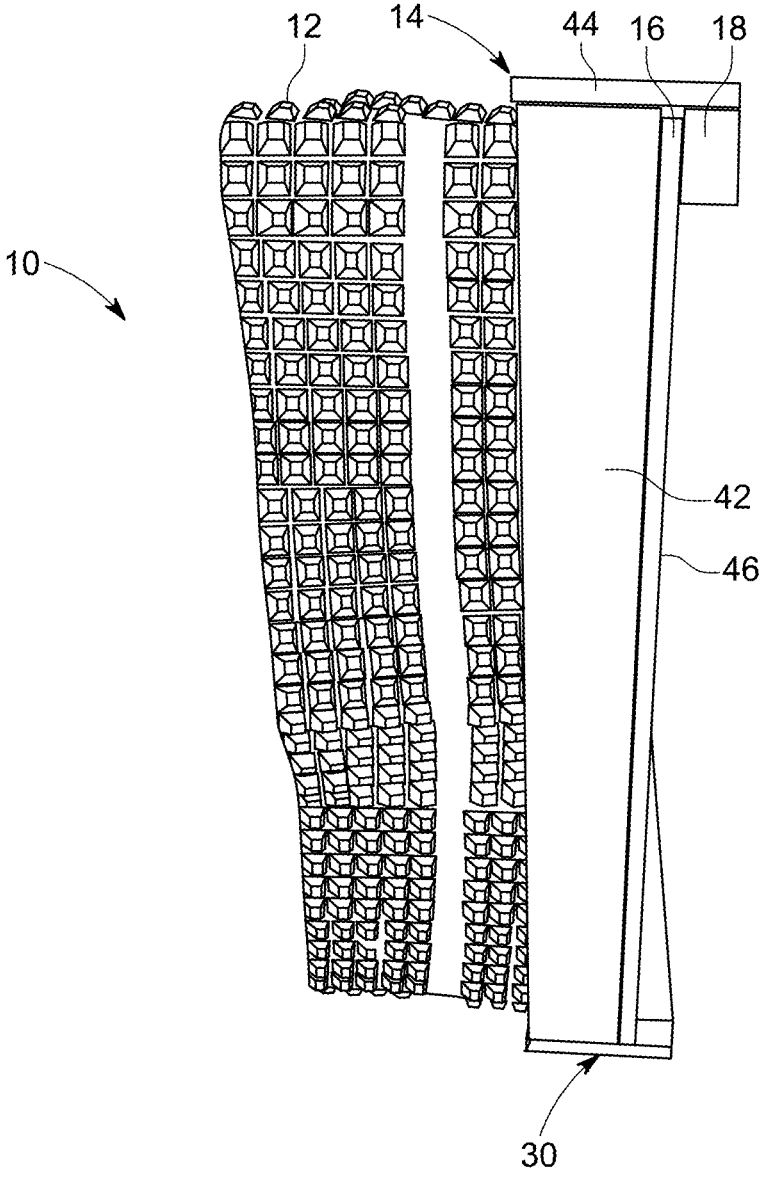
FIG. 9d illustrates a side view of a horizontal root system planter, in accordance with one embodiment.

FIGS. 9*a*-9*d* illustrate a horizontal root system planter, in accordance with the third embodiment. FIG. 9*a* illustrates a top perspective view. FIGS. 9*b* and 9*c* illustrate side perspective views. FIG. 9*d* illustrates a side view. As shown, the horizontal root system planter 10 includes a base structure 14 and a wall 12. The base structure 14 includes a base substructure comprising a deck and support pieces. The frame 30 comprises frame side pieces and frame end pieces. The frame side pieces 42 and frame end pieces 44 extend upwardly from the base substructure. A wall 12 comprising a single piece of plastic is provided within the frame 30, generally along a periphery of the deck against the frame. As shown in FIGS. 9*a* and 9*b*, a burlap covering may be provided on the deck within the frame.

As can be best seen in FIGS. 7*c*, 9*c*, and 9*d*, the support pieces 18 of the base substructure may create a ledger 46 under the deck 16. The ledger 46 is maintained on sides of the base structure 14 because the frame side pieces 44 do not extend below the deck 16. The ledger 46 can have two roles. A first role is to create an air gap between the ground and the deck 16 of the horizontal root system planter. Burlap covering the wood slats of the deck allows for oxygen to penetrate the soil in the horizontal root system planter from below which significantly increases colonization of the soil mix by the root system. Most traditional containers struggle to support root growth in the lower reaches of the container due to low oxygen levels. A second role is to allow access for the fork lift forks or a planting blade to slide under the horizontal root system planter when moving the horizontal root system planter and tree that it contains. Accordingly, in some embodiments the frame end pieces 44 extend to the ground (and over the support pieces 18) and the frame end pieces 42 terminate at the deck 16, leaving a lateral opening or ledger 46 between the support pieces 18.

Figure 10:
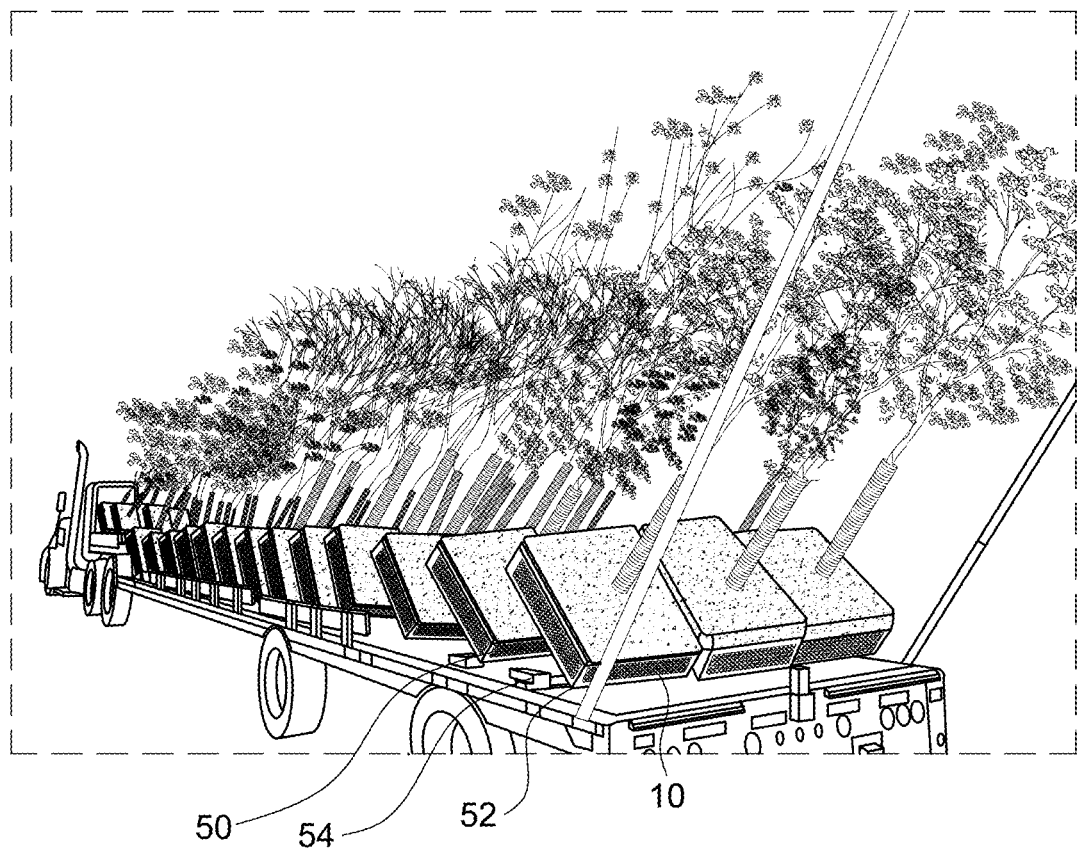
FIG. 10 illustrates a tip tray system, in accordance with one embodiment.

Tip Trays—Plants grown in the horizontal root system planters may be shipped in the planters using tip trays, for example positioned on a trailer. A tip tray system facilitates transport of trees in the horizontal root system planters to maximize space on a trailer bed. One embodiment of a tip tray system is shown in FIG. 10. The tip tray system supports the horizontal planters, with trees grown therein, to tip and stack in a tipped orientation. A plurality of rows 50 of horizontal root system planters 10 may be provided with each row stacking on an adjacent row. The tip tray system may include a rear support 52 for supporting the rear most horizontal planters and a plurality of lateral supports 54 between each row of tip trays. The tip tray system may be a steel system. The tip tray system may be provided on a trailer of a truck. In some embodiments, the horizontal root system planters may be self-tipping and a tip tray need not be used to tip the trees for transport.

Planting Tool—A tool is disclosed that can be used for tree transporting, digging, and planting operations. The tool may comprise a U-blade.

Horizontal root system planters as disclosed herein have a vastly different configuration from typical nursery planters. Typical nursery planters comprise deep, narrow buckets. Most commonly the buckets are round. Often these may be transported at a planting site using a wheelbarrow.

A tree grown in a horizontal root system planter is not amenable to transport using a wheelbarrow. As discussed, a horizontal root system planter may have planar dimensions of, for example, 32 inches wide by 24 inches long. The weight of dirt and a tree in the horizontal root system planter is significant.

Further, the hole dug for planting a horizontal root system planter is shaped differently than one dug for a plant grown in a typical nursery planter. A plant grown in a typical nursery planter has a long and relatively narrow root system. A hole for receiving a plant grown in a typical nursery planter is thus typically deep and narrow. In contrast, a hole for receiving the horizontal root system planter has planar dimensions somewhat larger than the horizontal root system planter (or, for example, larger than 32 inches wide by 24 inches long). The hole is dug to a depth sufficient to receive the horizontal root system planter and cover the roots with dirt, but maintain the roots at a depth that the roots may still access oxygen.

A tool that is configured for tree transporting, digging, and planting of a horizontal root system planter having a plant grown therein is disclosed. The tool may be referred to as a U-blade. The U-blade may be fit on a vehicle for use. For example, the U-blade may be fit on a loader, such as a GIANT® loader using an attachment plate. In general, it is useful for the U-blade to be fit on a vehicle having an articulable arm for moving the U-blade up and down and, optionally forward and backward.

Figure 11A:
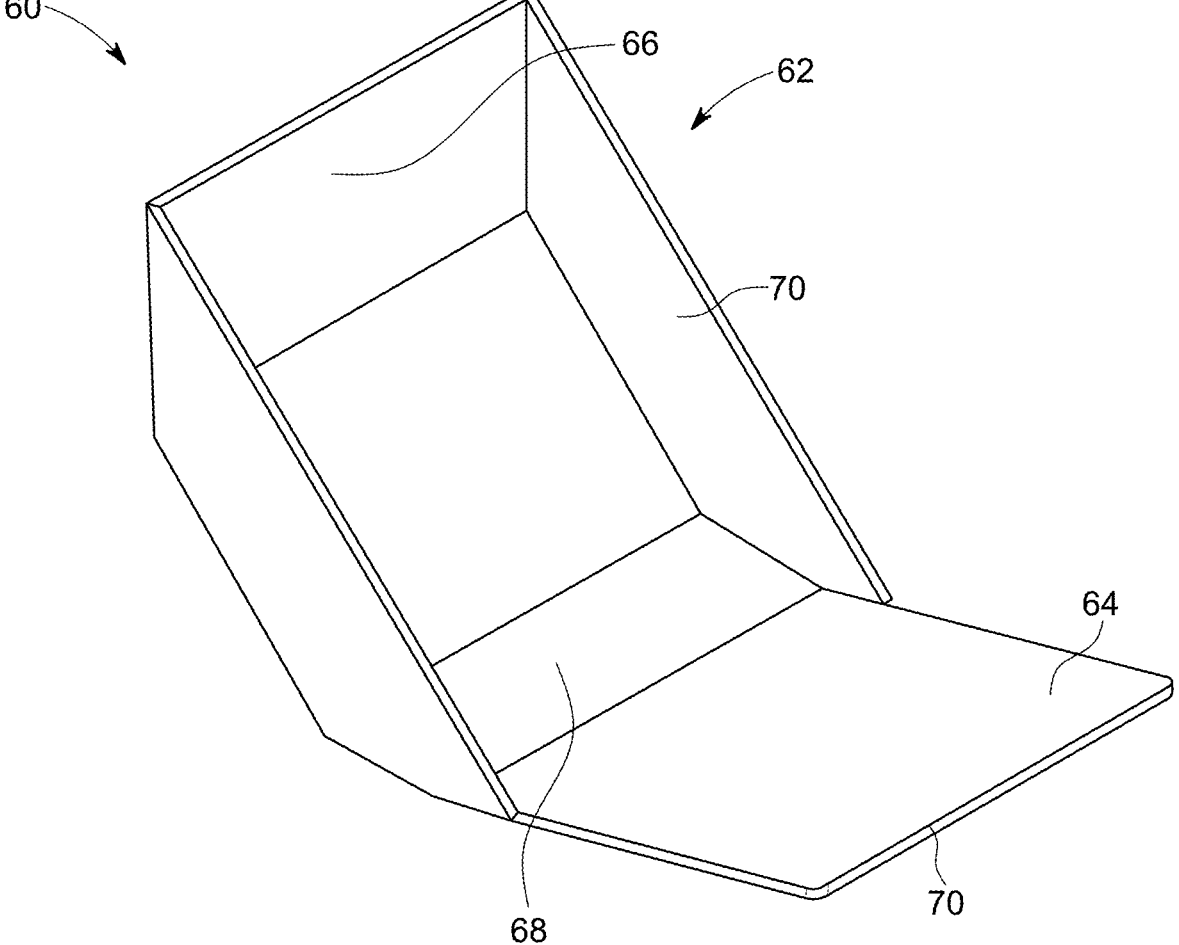
FIG. 11a illustrates a front perspective view of a U-blade, in accordance with one embodiment.
Figure 11B:
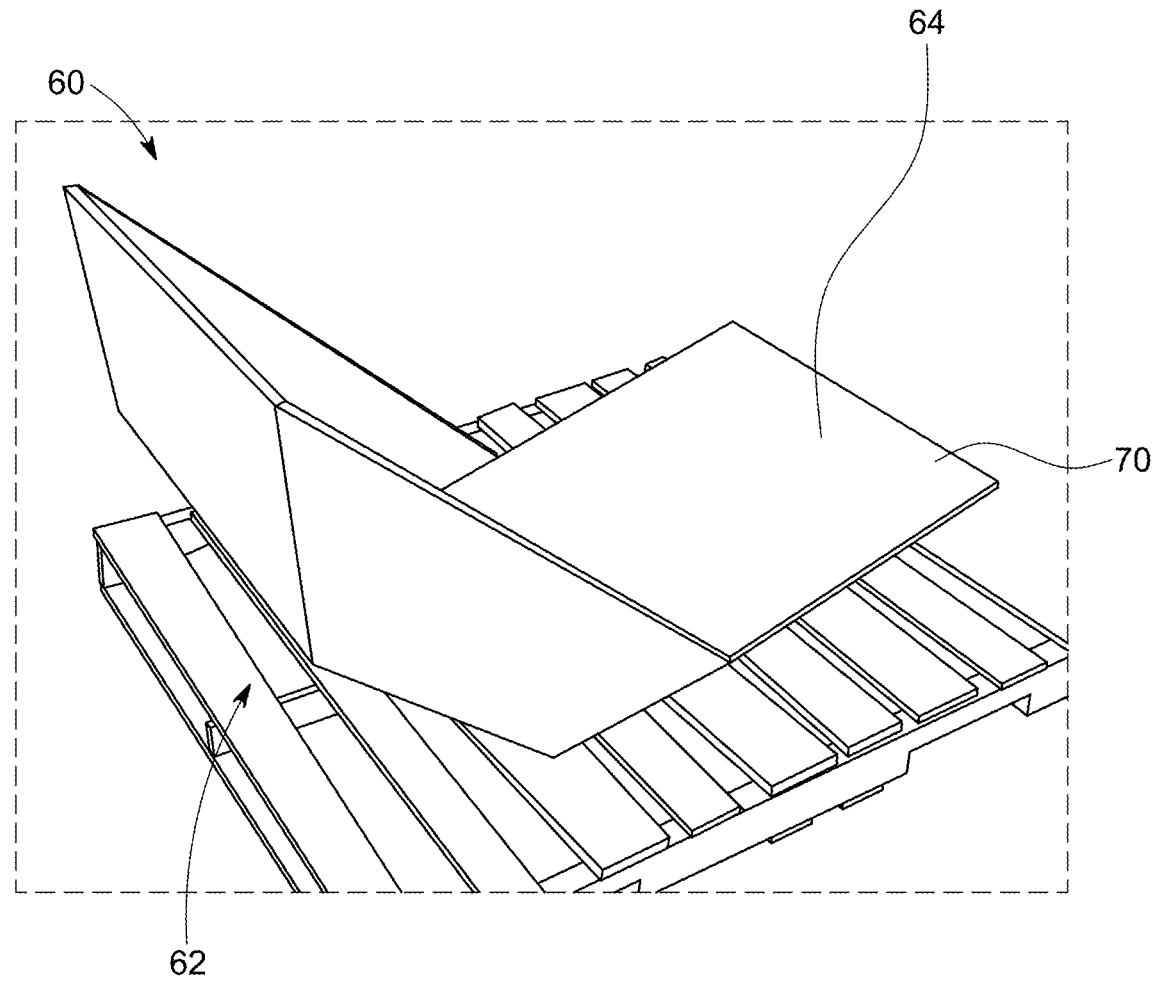
FIG. 11b illustrates a side perspective view of a U-blade, in accordance with one embodiment.
Figure 11C:
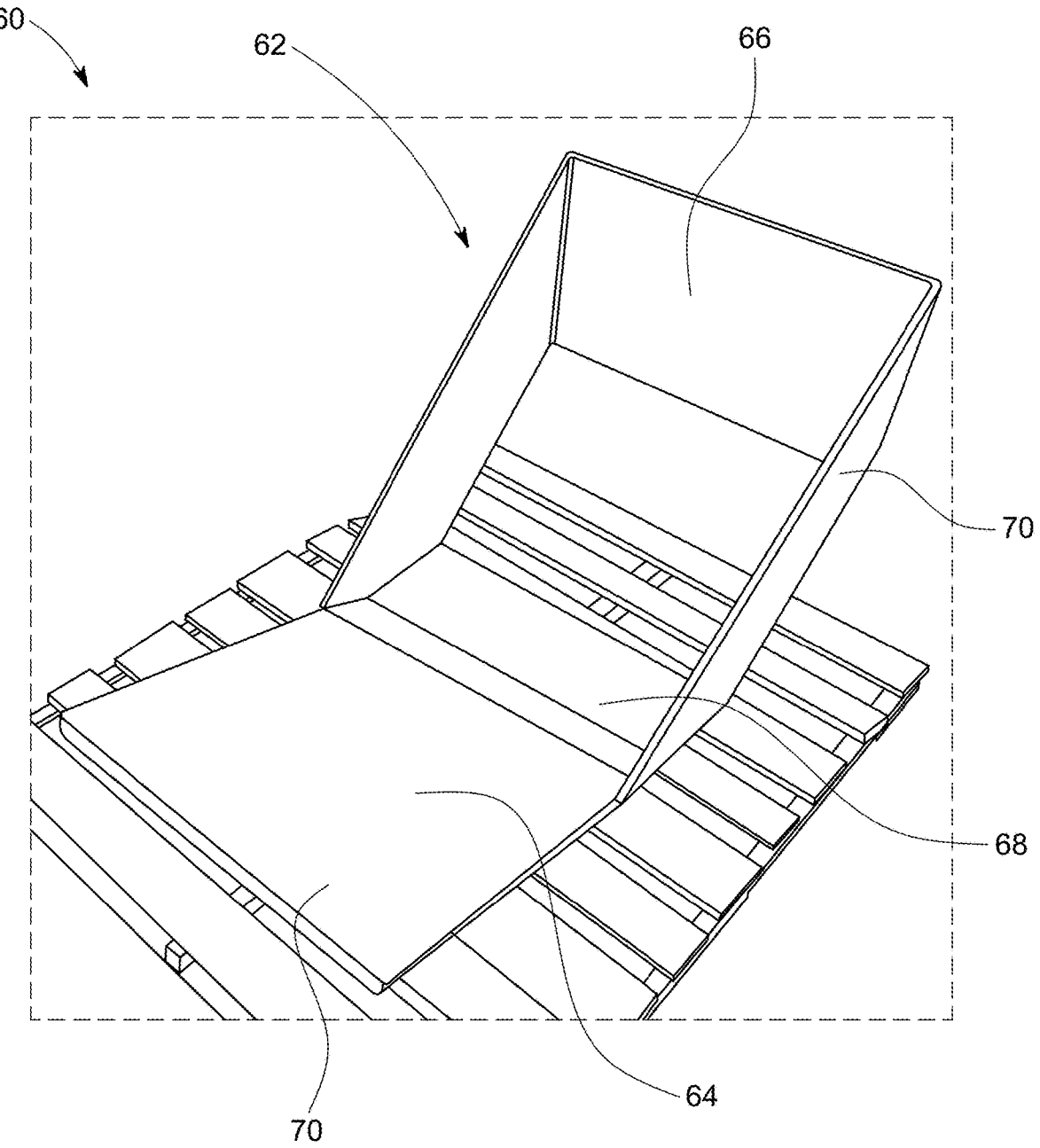
FIG. 11c illustrates a front perspective view of a U-blade, in accordance with one embodiment.
Figure 11D:
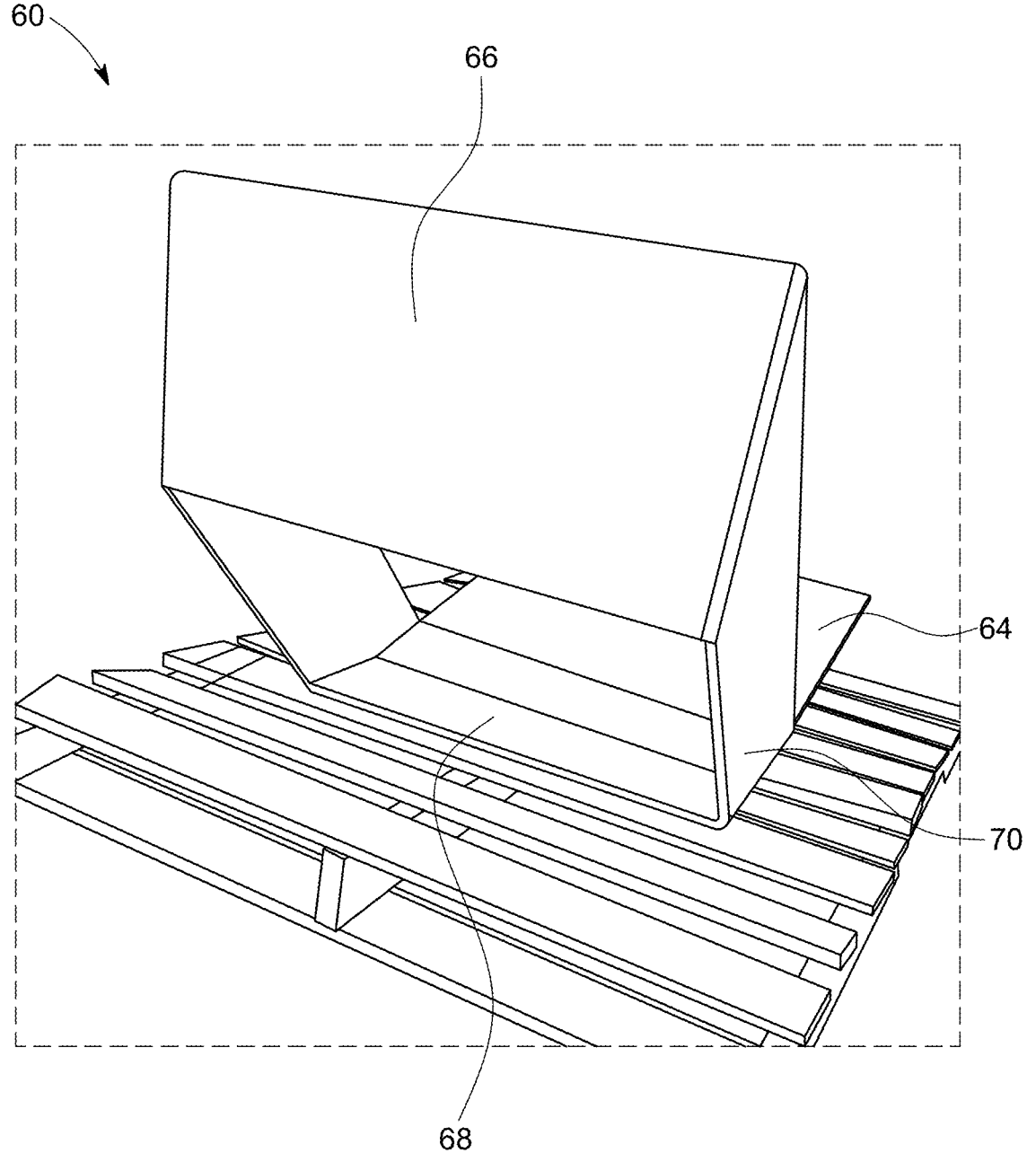
FIG. 11d illustrates a rear perspective view of a U-blade, in accordance with one embodiment.

FIGS. 11*a*-11*d* illustrate a U-blade 60 in accordance with one embodiment. FIGS. 11*a* and 11*c* illustrate front perspective views. FIG. 11*b* illustrates a side perspective view. FIG. 11*d* illustrates a rear perspective view. The U-blade 60 includes a box 62 and a blade 64. The box 62 includes an attachment end 66, a blade end 68, and two sides 70. The box 62 may be open, as shown, or may be closed. In an open embodiment, the space between the blade end and the attachment end, and the two sides, is open. This can reduce weight and assist in clearing dirt from the U-blade 60. The blade 64 may extend from the blade end 68. In some embodiments, the blade 64 is integral with the blade end 68. The blade 64 may have a platform and a front end 70. The platform may be sized for receiving a horizontal root system planter. The blade 64 may be a flat extension from and in line with the blade end 68, or may extend from the blade end 68 at an angle less than 180°. The attachment end 66 may be configured for attachment to, for example, an attachment plate of a vehicle. The blade 64 is sized and shaped for supporting a horizontal root system planter. A front end 70 of the blade 64 may be finished such that the blade 64 is able to dig into ground. For example, the front end 70 may be tapered and/or sharpened.

Figure 12A:
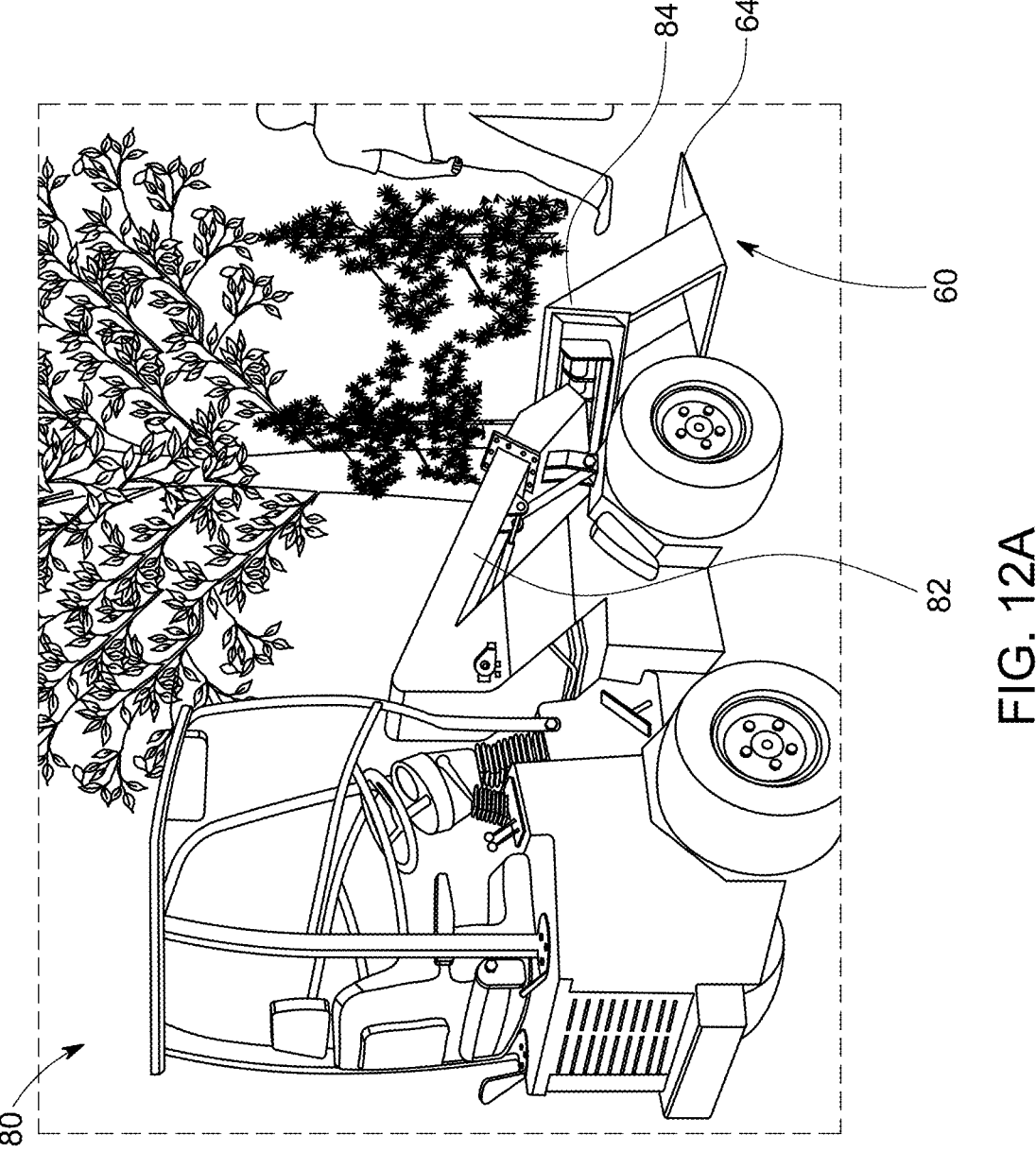
FIG. 12a illustrates a side rear perspective view of a U-blade as fit on a vehicle, in accordance with one embodiment.
Figure 12B:
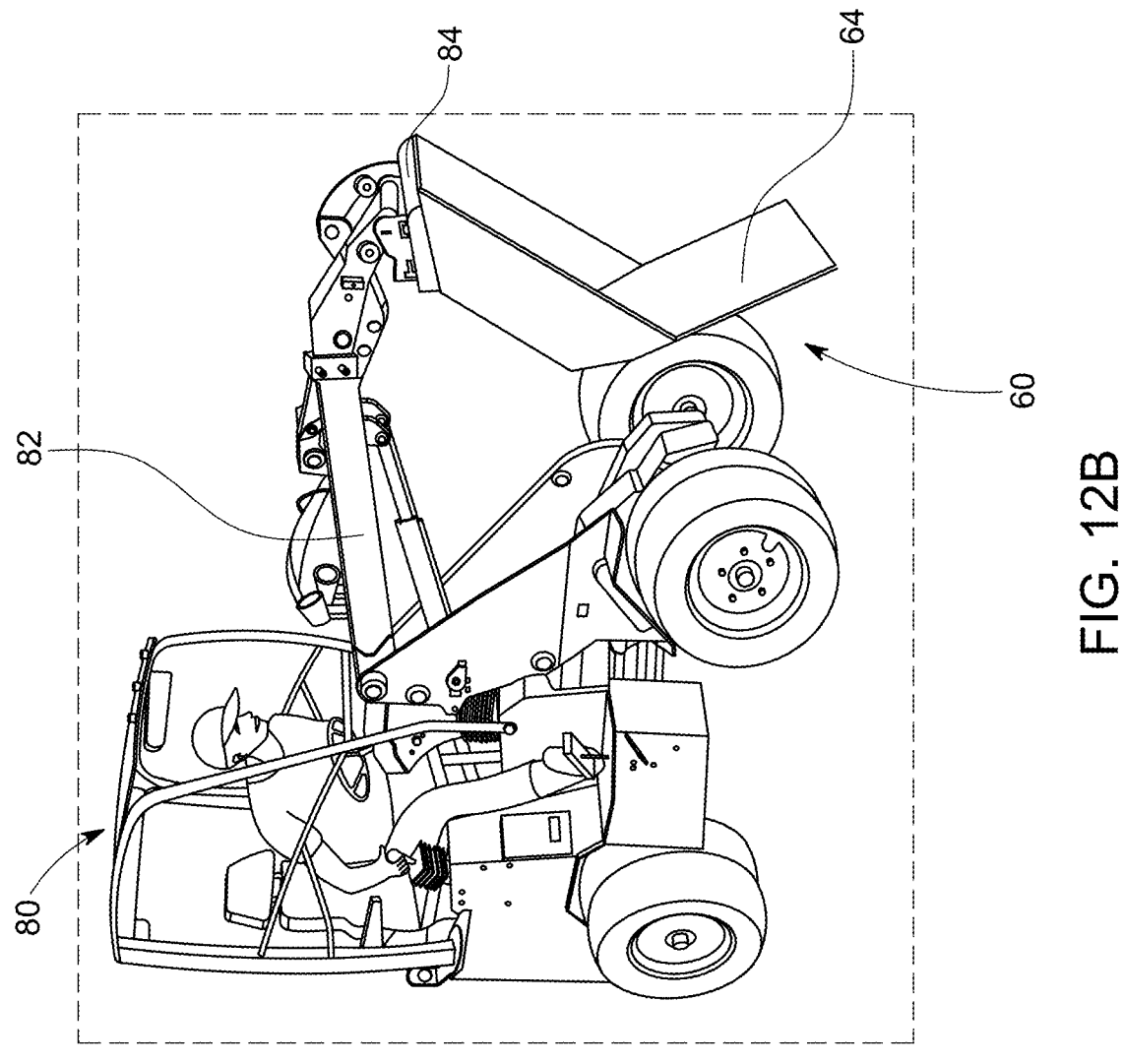
FIG. 12b illustrates a side front perspective view of a U-blade as fit on a vehicle, in accordance with one embodiment.
Figure 12C:
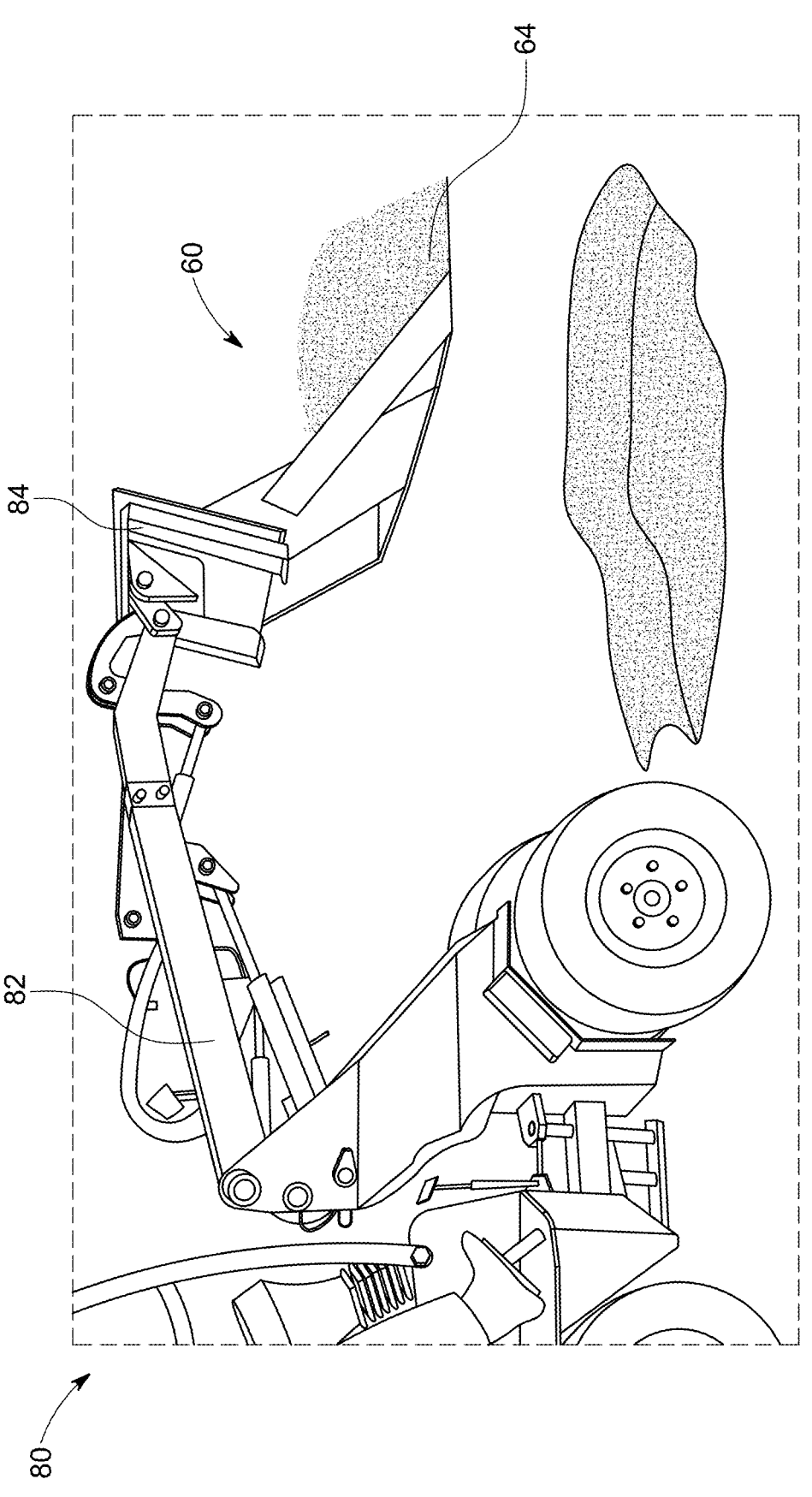
FIG. 12c illustrates a side view of a U-blade as fit on a vehicle, in accordance with one embodiment.
Figure 12D:
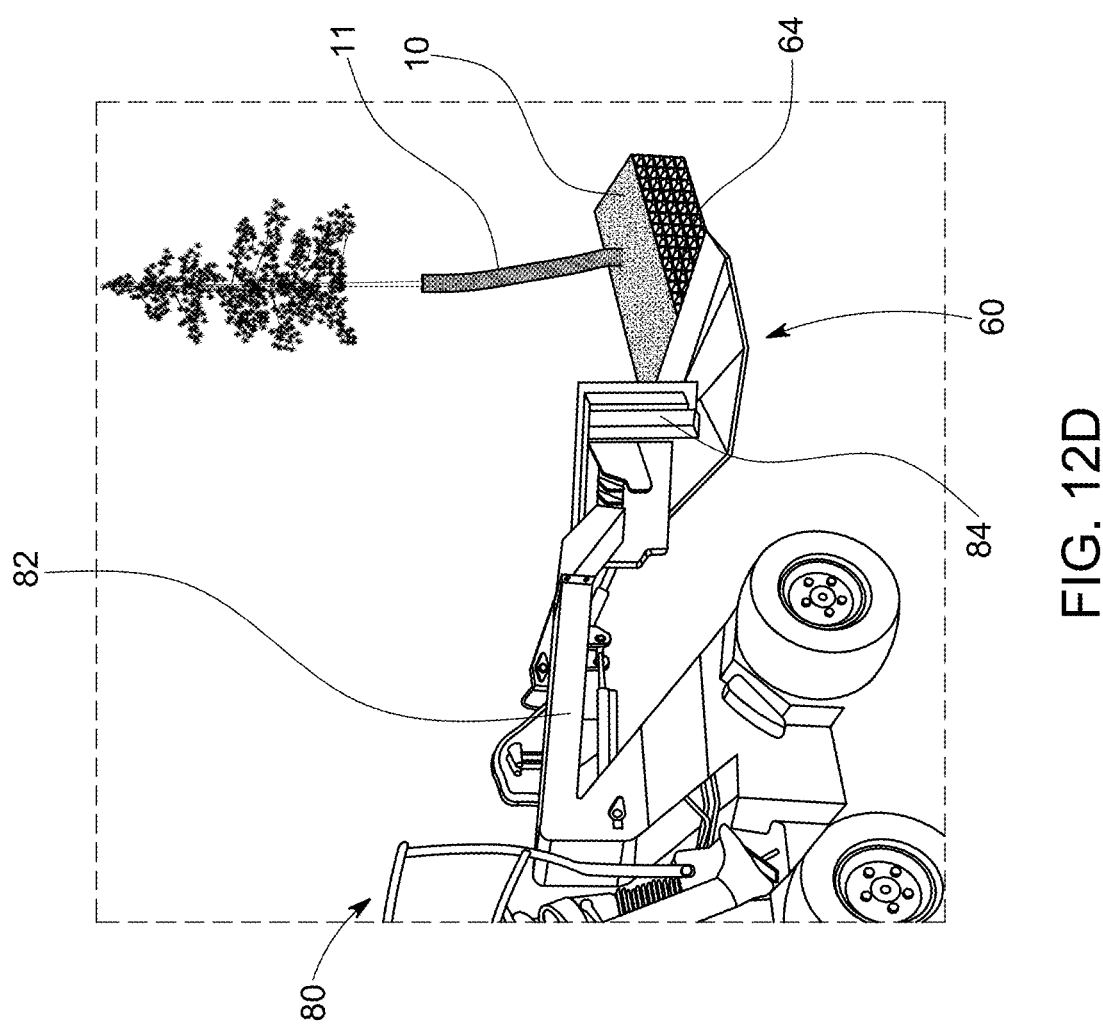
FIG. 12d illustrates a side view of a U-blade as fit on a vehicle, in accordance with one embodiment.
Figure 12E:
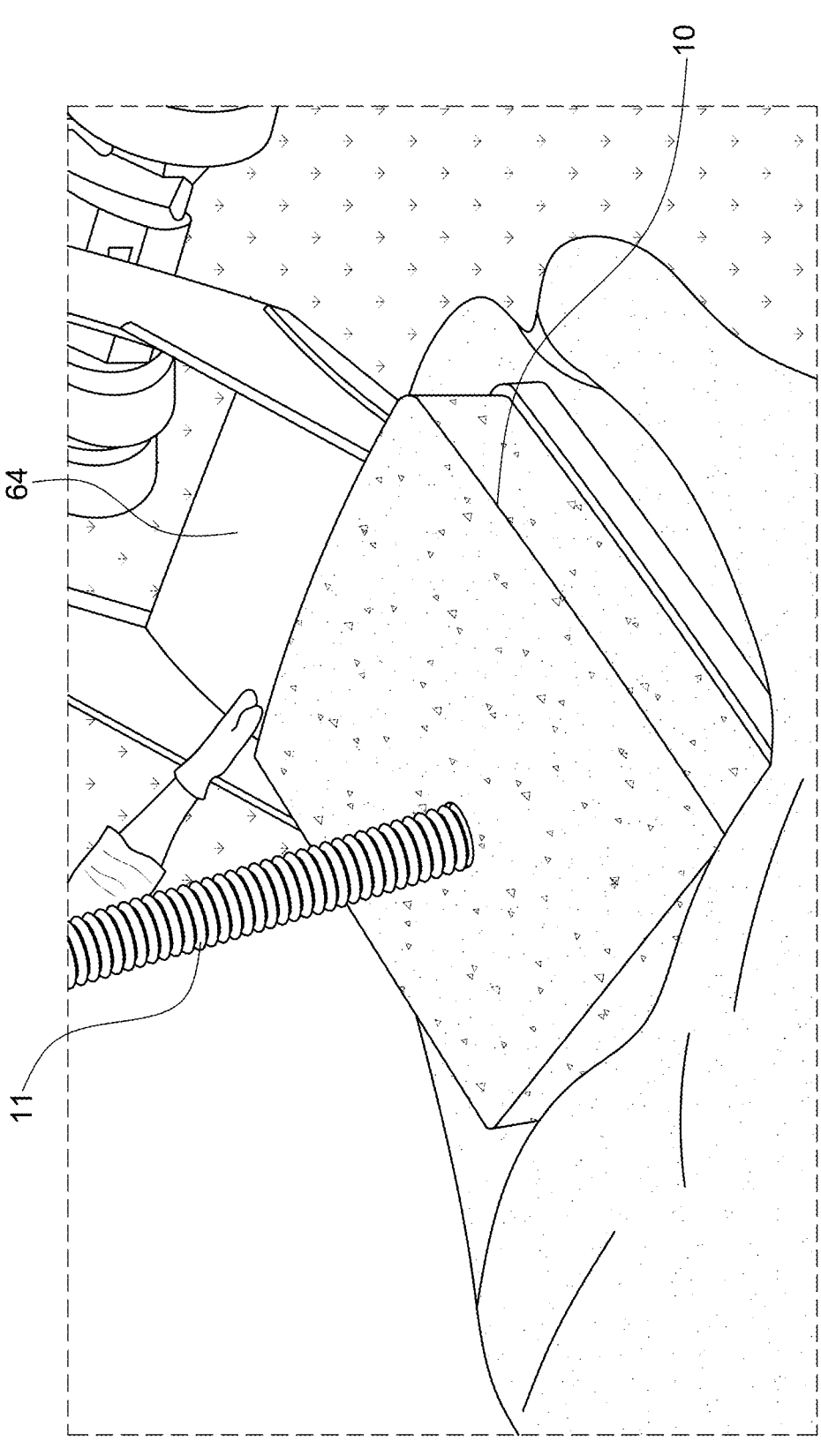
FIG. 12e illustrates a top perspective view of a U-blade as fit on a vehicle, in accordance with one embodiment.

FIGS. 12*a*-12*e* illustrate a U-blade 60 as fit on a vehicle 80. FIG. 12*a* illustrates a side rear perspective view. FIG. 12*b* illustrates a side front perspective view. FIGS. 12*c* and 12*d* illustrate a side views. FIG. 12*e* illustrates a top perspective view. In the embodiment shown, the vehicle 80 is a loader with an articulable arm 82. The articulable arm 82 includes an attachment plate 84. The U-blade 60 is fixed to the articulable arm 82 by coupling of the attachment end 66 of the box 62 of the U-blade 60 to the attachment plate 84.

FIG. 12*a* illustrates the U-blade 60 in a lowered position with the blade 64 oriented substantially horizontally. In this position, the blade 64 may receive a horizontal root system planter, for example. In contrast, FIG. 12*b* illustrates the U-blade 60 in a raised position with the blade 64 oriented substantially vertically. In this position, the blade 64 is positioned for pressing into the ground to begin digging a hole for receiving the horizontal root system planter. FIG. 12*c* illustrates the U-blade 60 in a raised position with the blade 64 oriented substantially horizontally. As shown, the U-blade 60 is carrying dirt that was removed to form a hole for receiving the horizontal root system planter. FIG. 12*d* illustrates the U-blade 60 in a raised position with the blade 64 oriented generally horizontally. In this position, the blade 64 is positioned for carrying a horizontal root system planter 10 and tree 11. FIG. 12*e* illustrates the U-blade 60 in a lowered position with the blade 64 oriented substantially horizontally. In this position, the blade 64 is positioned for placing a horizontal root system planter 10 into a hole for planting.

Figure 13A:
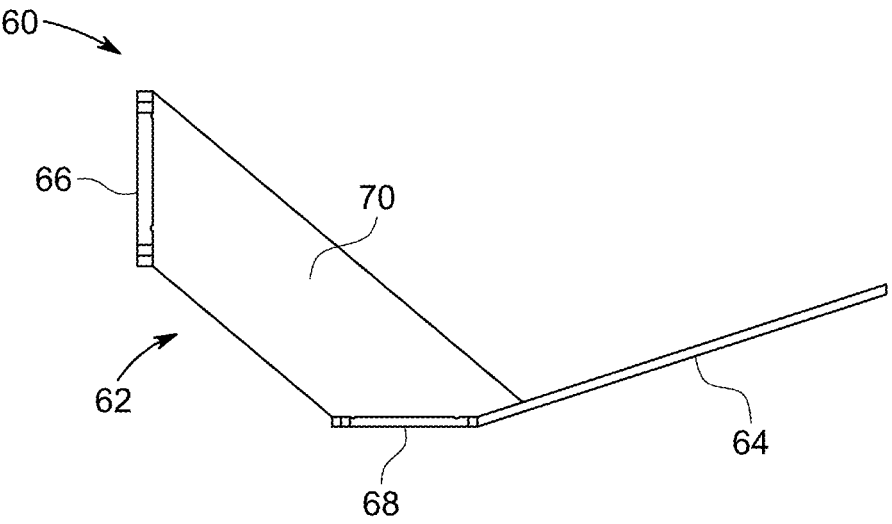
FIG. 13a illustrates a side view schematic of a U-blade, in accordance with one embodiment.
Figure 13B:
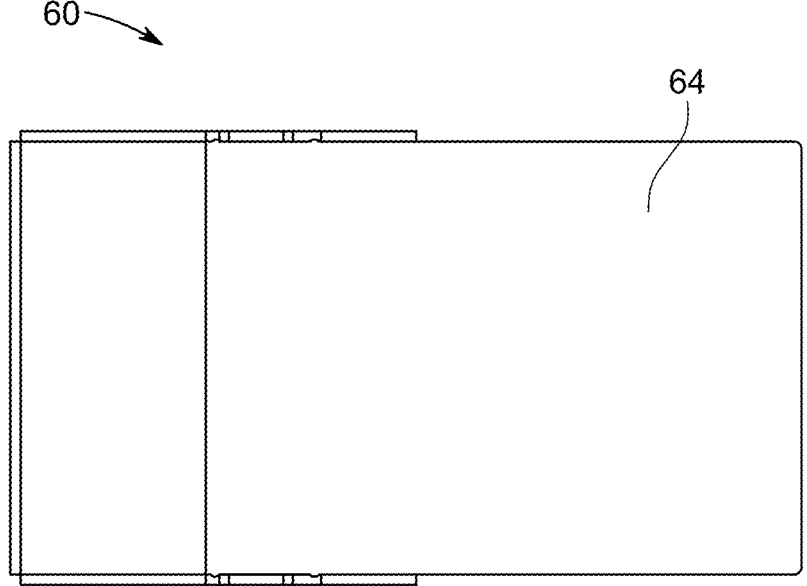
FIG. 13b illustrates a top view schematic of a U-blade, in accordance with one embodiment.
Figure 13C:
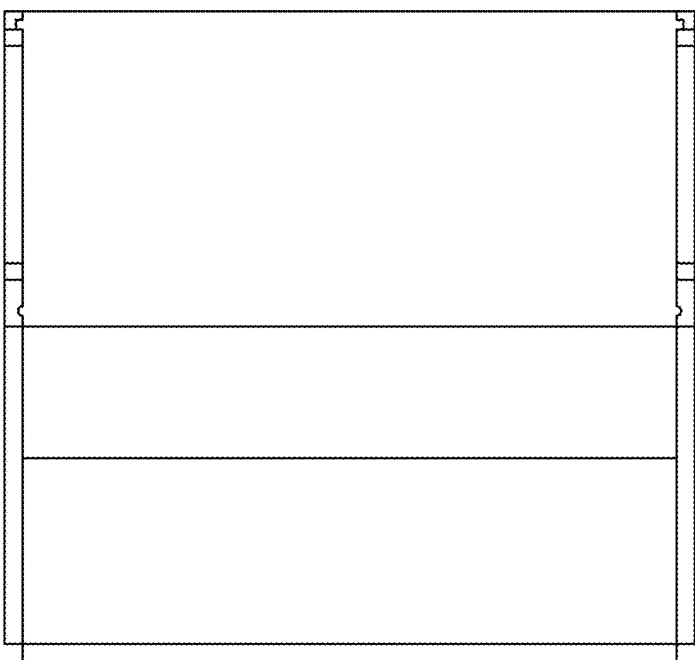
FIG. 13c illustrates and end view schematic of a U-blade, in accordance with one embodiment.
Figure 13D:
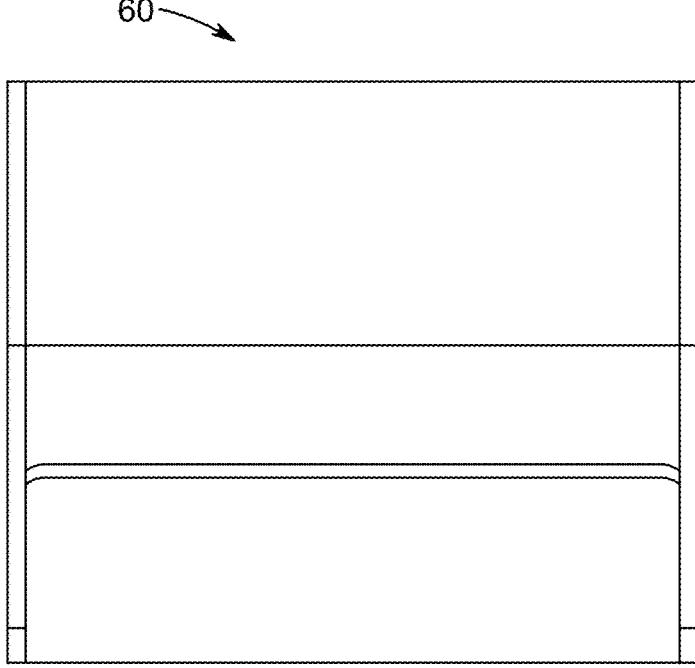
FIG. 13d illustrates and end view schematic of a U-blade, in accordance with one embodiment.

FIGS. 13*a*-13*d* illustrate schematics for a U-blade 60, in accordance with one embodiment. FIG. 13*a* illustrates a side view. FIG. 13*b* illustrates a top view. FIGS. 13*c* and 13*d* illustrate end views. As discussed, the U-blade includes a box 62 and a blade 64. The box 62 includes an attachment end 66, a blade end 68, and two sides 70. The blade 64 may extend from the blade end 68 at a 180° angle or at an angle less than 180°. As shown in FIG. 13*a*, the attachment end 66 and the blade end 68 of the box 62 may be at approximately 90° to one another. In the embodiment shown, the blade 64 extends from the blade end 62 at approximately 165°, or 15° from the ground.

In one embodiment, with the blade end 68 resting on the ground, the box 62 extends 23.3" upwardly, with the attachment end 66 accounting for 12" of that extension, the blade end 68 extends approximately 8.06 inches, and the blade 64 extends approximately 24.25 inches from the blade end 62. The blade 64 thus may have a support surface of, for example, 24.25×24 inches. With such dimensions, a horizontal root system planter having planar dimensions of 32×24 inches will extend forwardly from the support surface. This may assist in placement of the horizontal root system planter into a hole.

In general, the blade may have any suitable width for receiving and supporting the horizontal root system planters. In various embodiments, the blade may be configured such that the support surface is approximately the same size as the planar dimensions of a horizontal root system planter, is larger than the planar dimensions of a horizontal root system planter, or is smaller in one dimension than the planar dimensions of a horizontal root system planter.

Method of Growing

Figure 14:
FIG. 14 illustrates a exemplary method of growing a tree using the disclosed system, in accordance with one embodiment.
Figure 14:
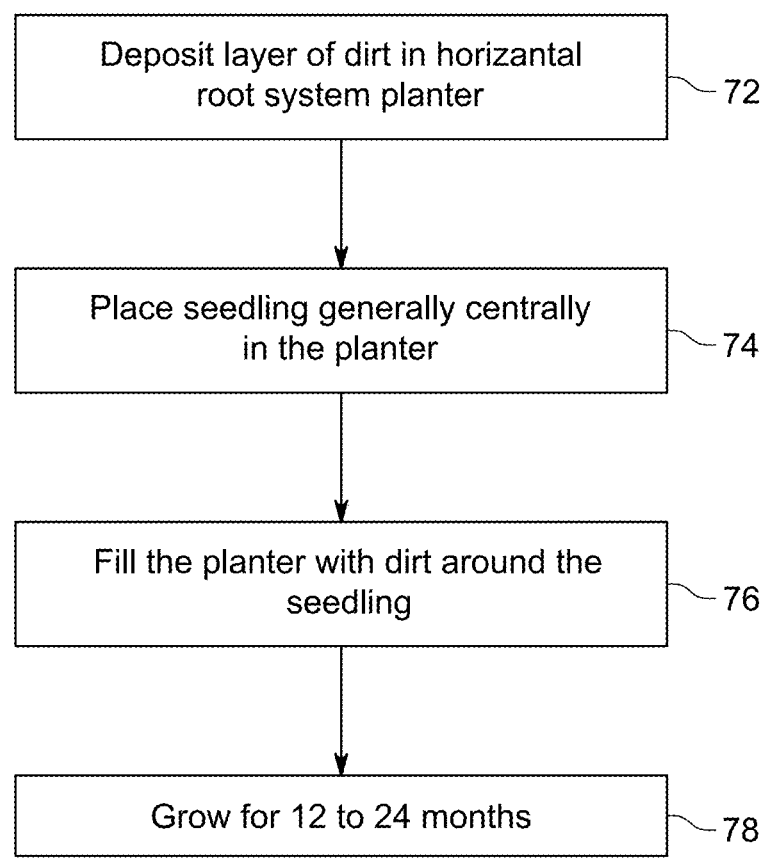

FIG. 14 illustrates an exemplary method 70 of growing a tree using the disclosed system. FIGS. 15*a*-26 illustrate steps of the method using various embodiments of the horizontal root system planter.

Figure 15A:
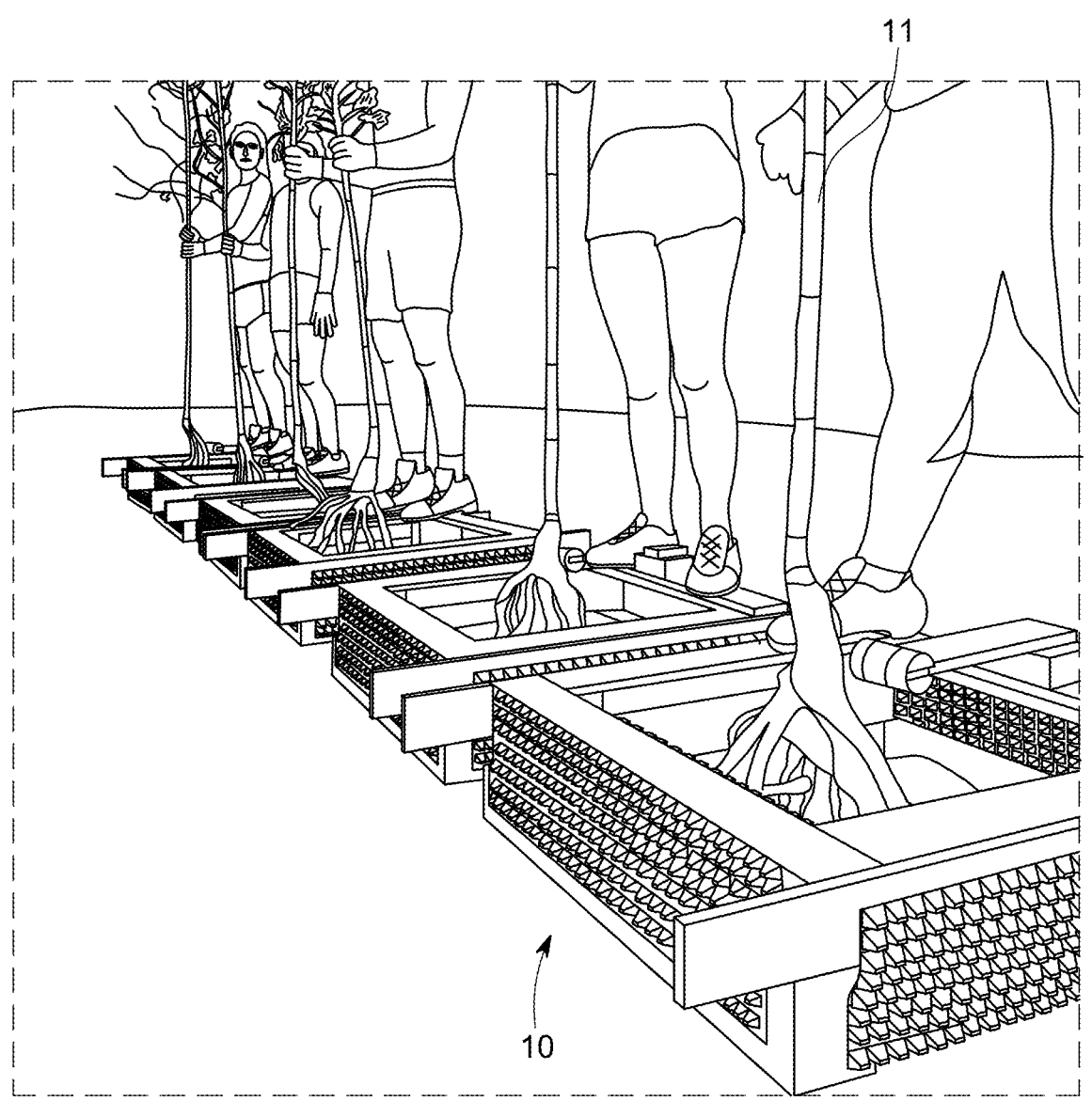
FIG. 15a illustrates planting a tree in a horizontal root system planter, in accordance with one embodiment.
Figure 15B:
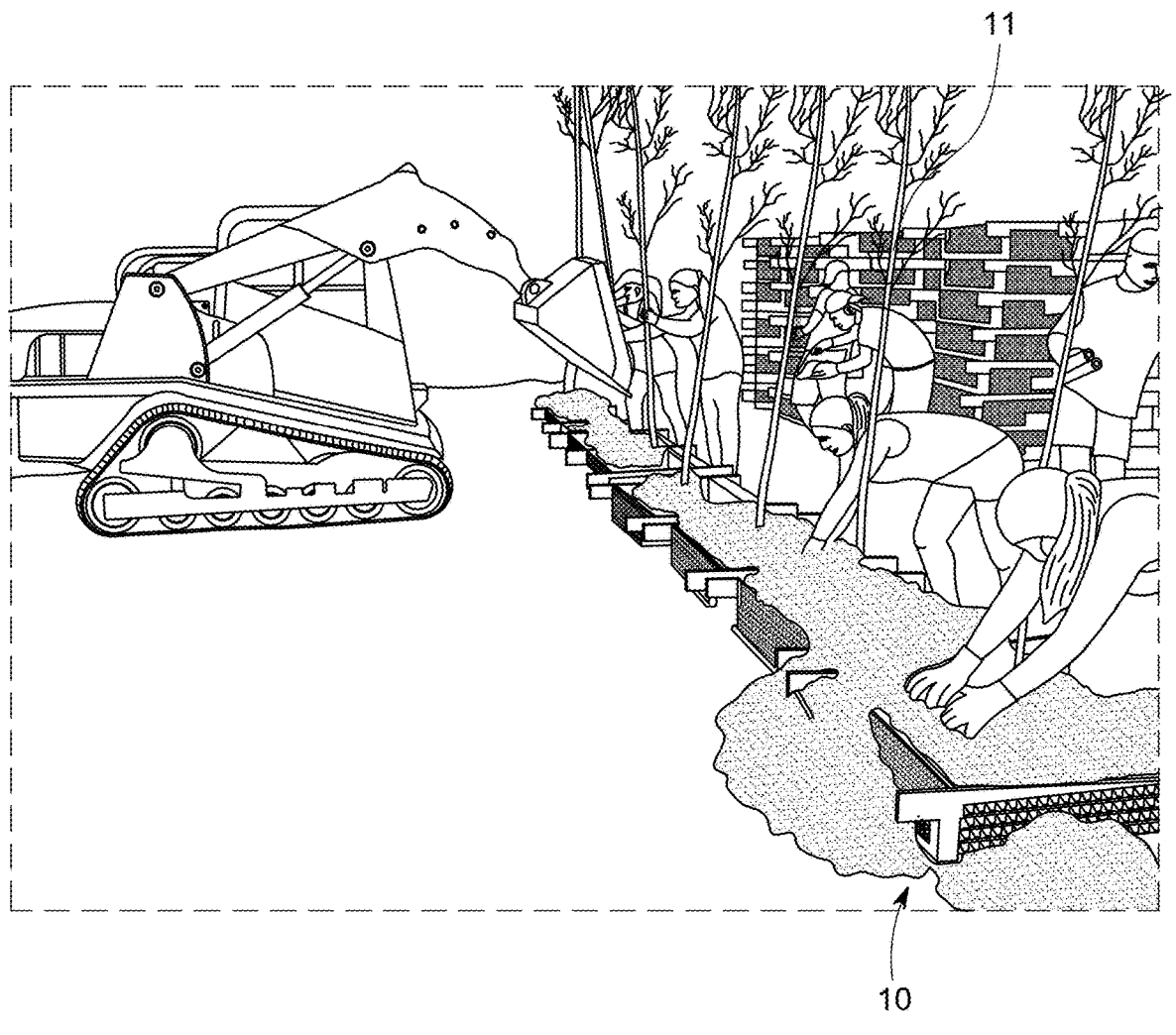
FIG. 15b illustrates planting a tree in a horizontal root system planter, in accordance with one embodiment.
Figure 15C:
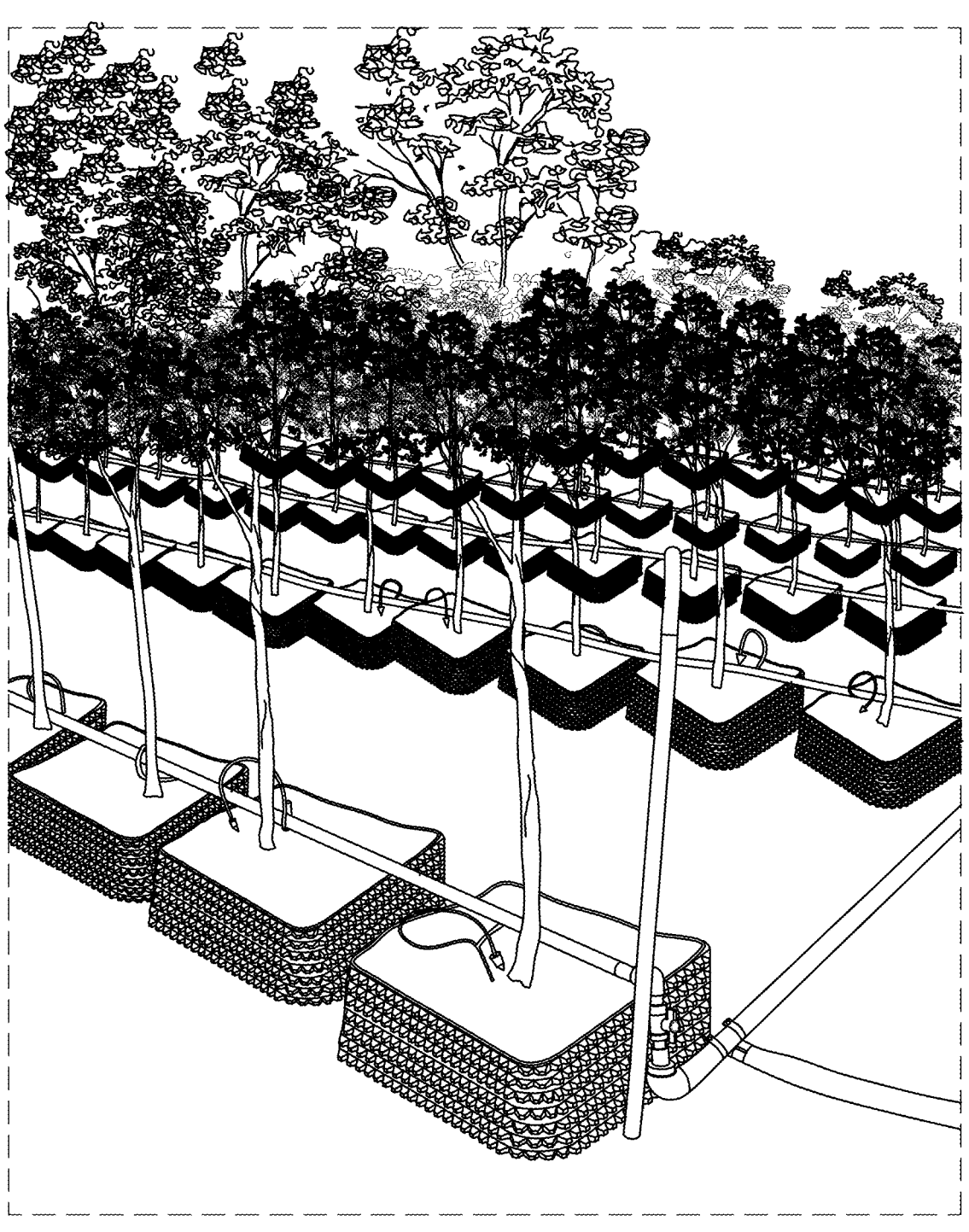
FIG. 15c illustrates a plurality of horizontal root system planters growing trees in an above ground set up, in accordance with one embodiment.

The tree is grown in a horizontal root system planter such as described above. An initial layer of dirt or soil may be put into the horizontal root system planter 72. FIGS. 15*a* and 15*b* illustrate planting a tree in a horizontal root system planter 10 in accordance with the second embodiment. As shown in FIG. 15*a*, a seedling 11 is positioned generally centrally on the layer of dirt 74. At step 76, dirt is filled around the seedling 11, shown in FIG. 15*b*. The tree is then left to grow for 12-24 months 78. FIG. 15*c* illustrates a plurality of horizontal root system planters growing trees in an above ground set up.

Using a horizontal root system planter such as disclosed herein, oxygen is able to penetrate the horizontal root system planter from above, from all four sides, and from below during nursery production. This produces explosive growth both in the nursery and once the trees are planted. Drip irrigation and moderate fertilization can optionally be used to ensure that all growth parameters are present for maximum growth.

In some embodiments, the seedlings are grown in a field before placement in the horizontal root system planter. Growth in a field encourages the seedlings to develop a natural root system. The trees then are grown in the above ground platforms, or horizontal root system planters, for 12-24 months. The shape and size of the horizontal root system planters encourages the roots to grow radially outwardly and not substantially downwardly. In general, the trees may be grown in the planter until they are approximately 2" in diameter measured 6 inches off the ground. For transplanting, shade trees may be grown to 12 to 15 feet in height, and ornamental trees may be grown to 8 to 12 feet in height.

Method of Planting

Figure 16:
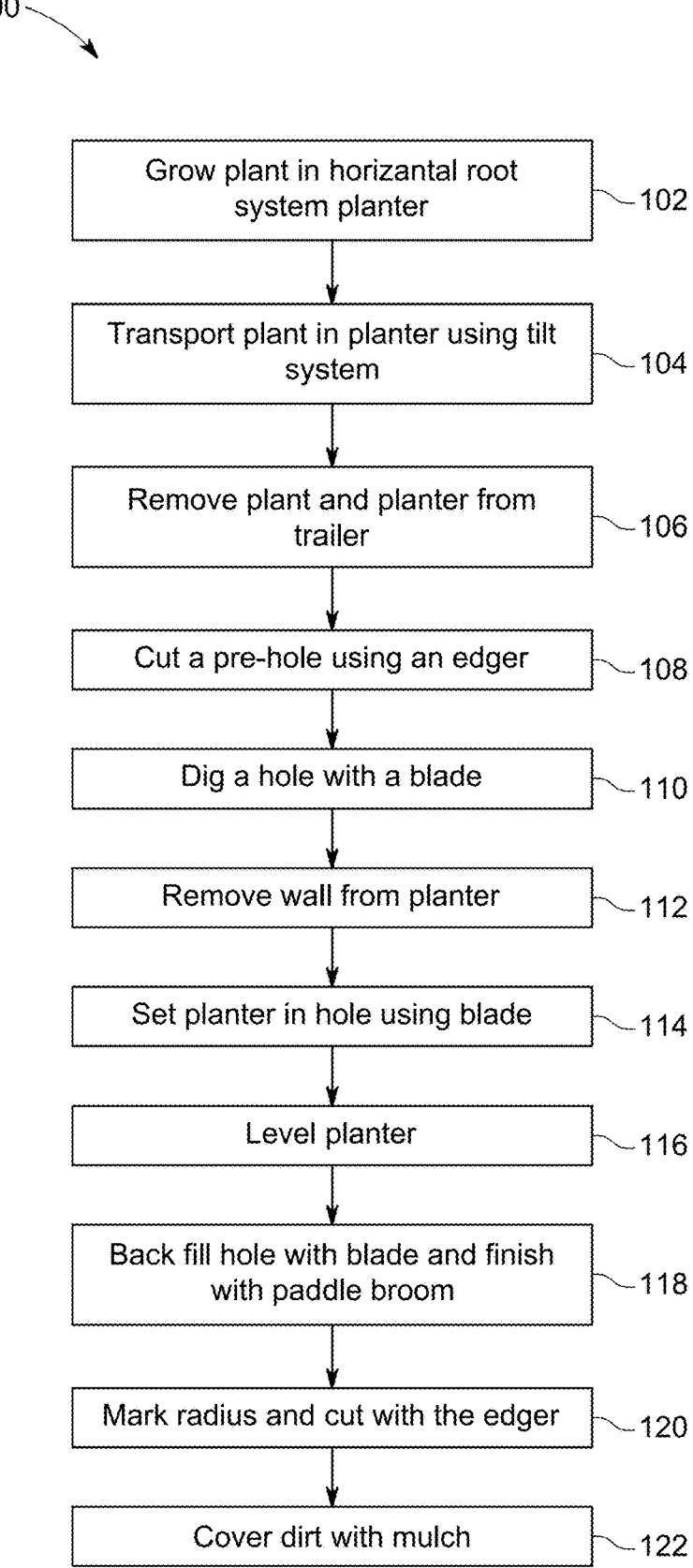
FIG. 16 illustrates a method of transporting and planting a tree using the disclosed system, in accordance with one embodiment.

FIG. 16 illustrates an exemplary method of transporting and planting a tree using the disclosed system. FIGS. 17*a*-26 illustrate steps in the method using a horizontal root system planter in accordance with the second embodiment. It is to be noted that while these figures illustrate planting of a plant that has been grown in a horizontal root system planter in accordance with the second embodiment, the method is equally applicable to planting of a plant that has been grown in a horizontal root system planter using any embodiment.

Figure 17:
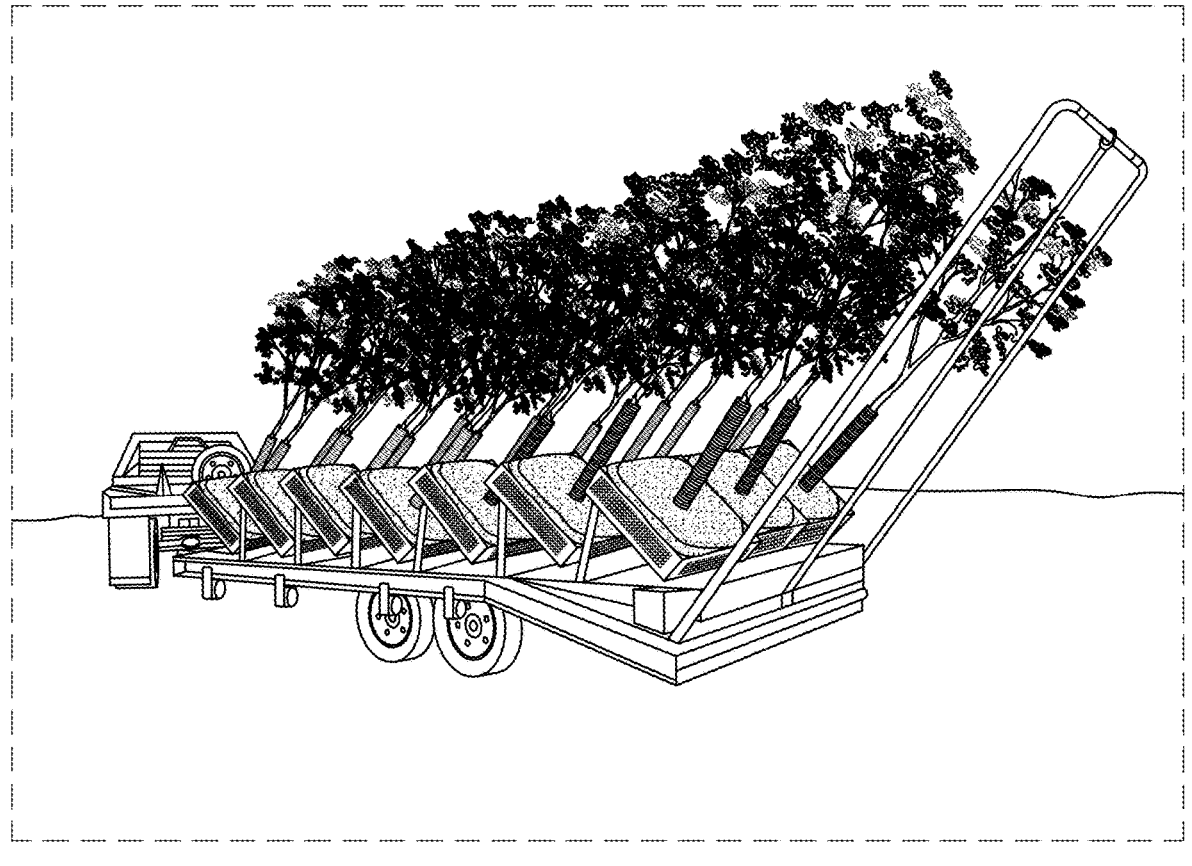
FIG. 17 illustrates transporting plants in horizontal root system planters on a trailer using a tip tray system, in accordance with one embodiment.
Figure 18A:
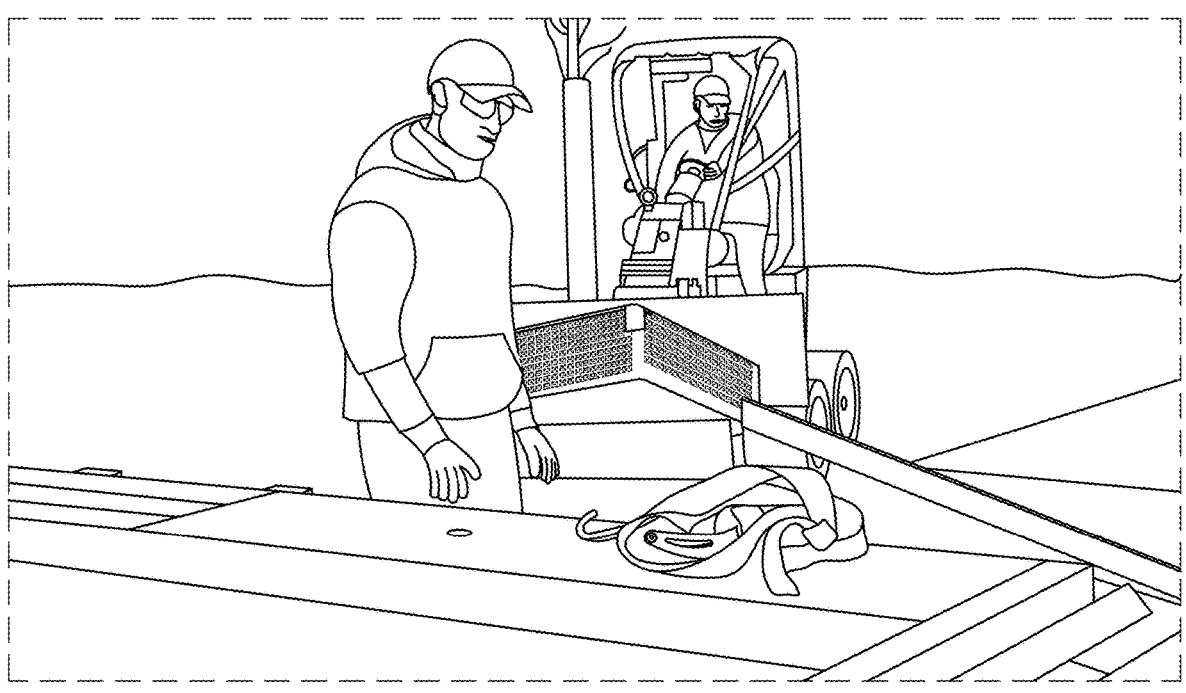
FIG. 18a illustrates a first step of removing a tree in a horizontal root system planter from a trailer, in accordance with one embodiment.
Figure 18B:
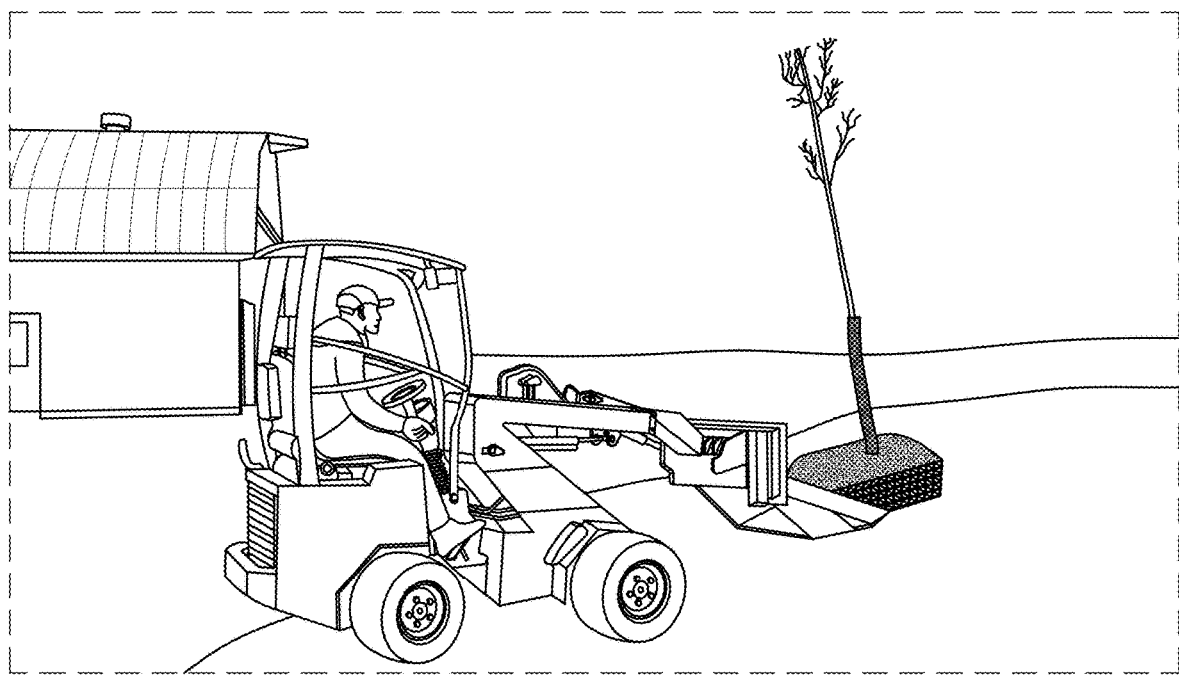
FIG. 18b illustrates a second step of removing a tree in a horizontal root system planter from a trailer, in accordance with one embodiment.
Figure 19A:
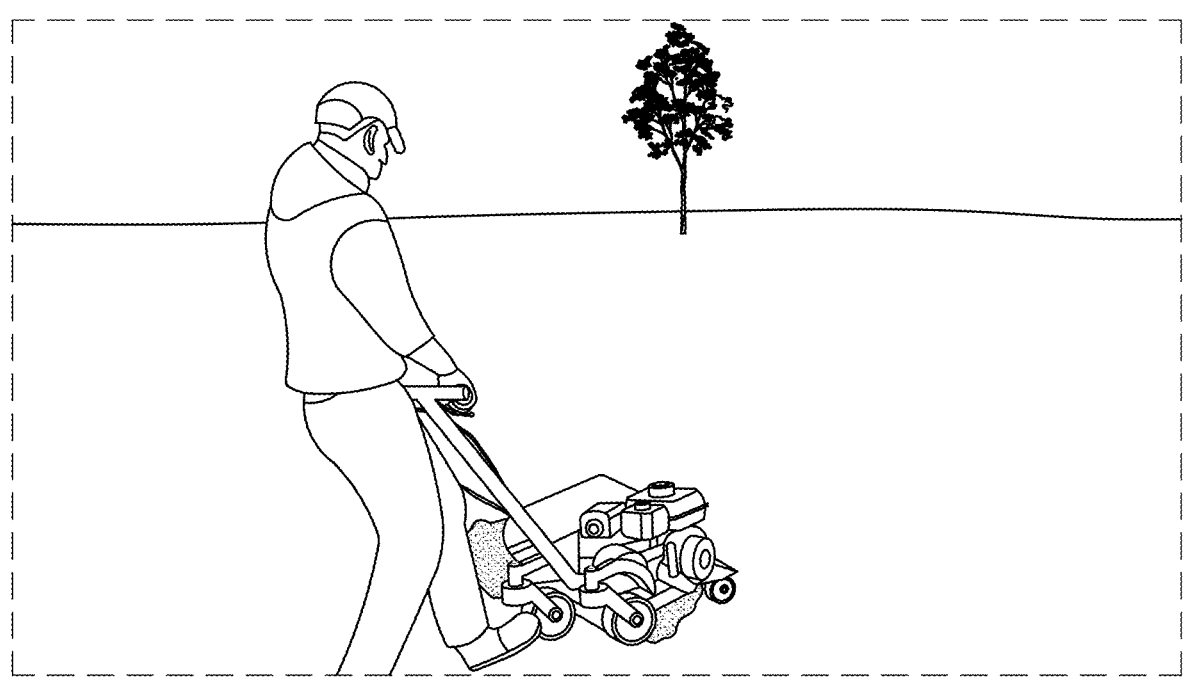
FIG. 19a illustrates cutting a pre-hole, in accordance with one embodiment.
Figure 19B:
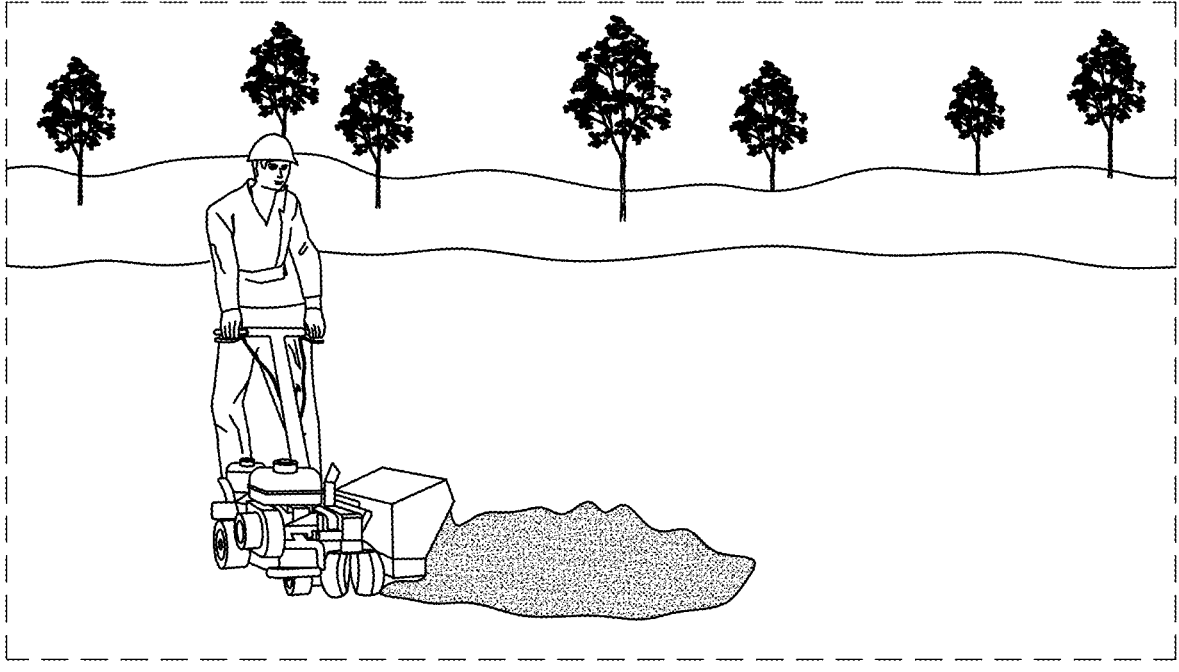
FIG. 19b illustrates cutting a pre-hole, in accordance with one embodiment.
Figure 20A:
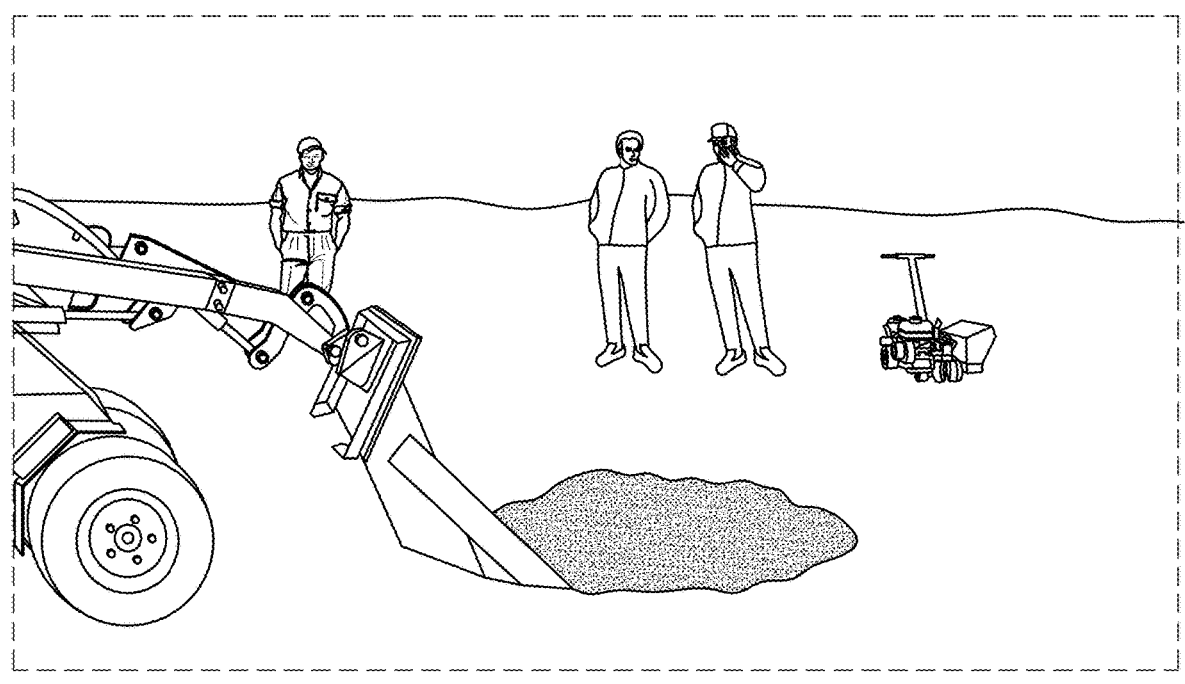
FIG. 20a illustrates a first step of digging a hole with a U-blade, in accordance with one embodiment.
Figure 20B:
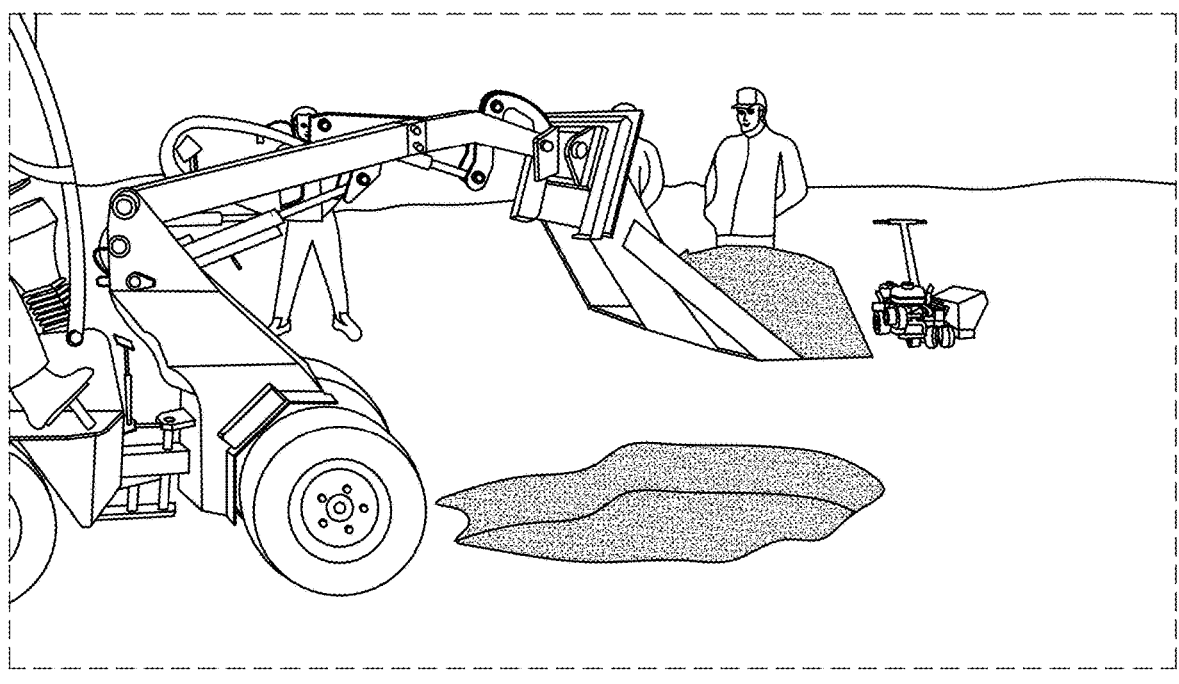
FIG. 20b illustrates a second step of digging a hole with a U-blade, in accordance with one embodiment.

A tree, or plant, is grown in a horizontal root system planter 102, such as described with respect to FIG. 14. The plant is transported to the planting site in the planter. 104 While any mechanism of transport may be used, FIG. 17 illustrates transporting the plants in the horizontal root system planters on a trailer using a tip tray system. A tip tray system can be used to facilitate meeting shipping height restrictions creating a uniform canopy slope for tarp installation after trees leaf out. The tip tray system is configured to tip trees with maximum shipping space utilized. The plant and planter are removed from the trailer 106, as shown in FIGS. 18*a* and 18*b*.

The planting site is prepared for receiving the tree. This comprises cutting a pre-hole 108, for example using an edger, shown in FIGS. 19*a* and 19*b*, and digging a hole 110, for example using a U-blade, shown in FIGS. 20*a* and 20*b*. In some embodiments, the hole may be dug to a depth of approximately 6-8 inches. The depth of the hole may vary but, in general, deep-planting should be avoided.

Figure 21A:
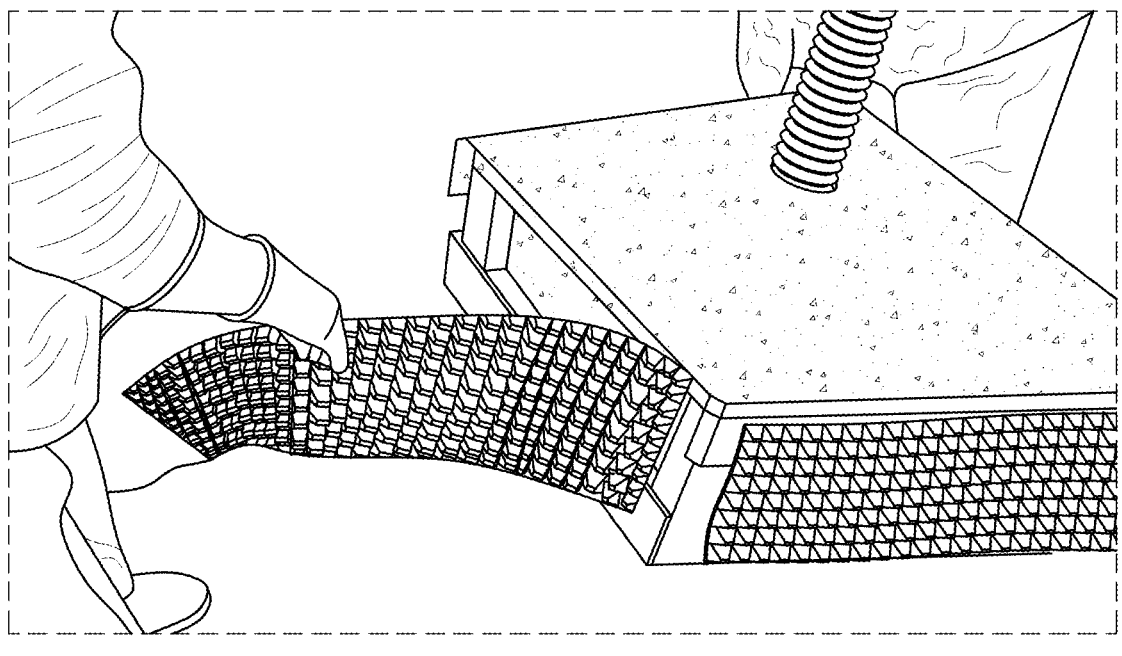
FIG. 21a illustrates removing plastic from a horizontal root system planter, in accordance with one embodiment.
Figure 21B:
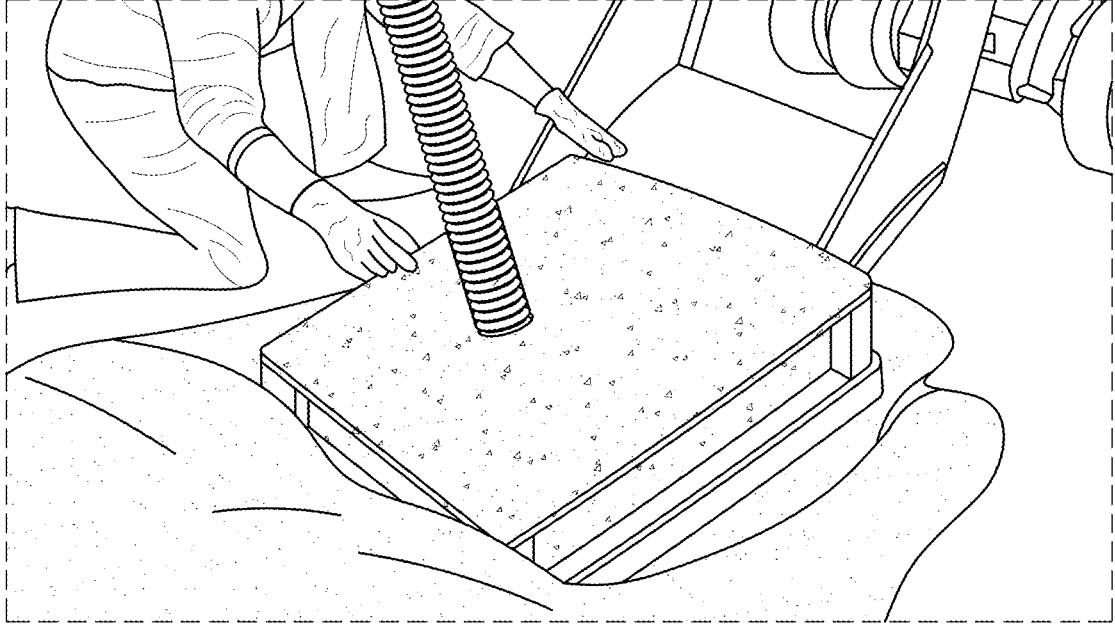
FIG. 21b illustrates setting a tree with a horizontal root system platform in a hole, in accordance with one embodiment.

The flexible wall may be removed from the horizontal root system planter and the tree 112 and planter set in place in the prepared hole 114, shown in FIGS. 21 *a* and 21 *b* to prepare the tree for planting. In alternative embodiments, the flexible wall may be, for example, bio-degradable, and may be left in place.

With specific reference to a horizontal root system planter of the second embodiment with the dimensions set forth above, the planter has a volume of 60 nursery gallons (different than liquid gallons). The system sets the tree 1-3" high at the planting site which places the 9" thick root system at the perfect level at the site—the 7' diameter final planting hole width allows for the 60 gallons of soil displaced by the horizontal root system planter to be distributed to the perimeter of the planting hole from the crown in the center of the hole where the tree trunk emerges from the soil—tapered to 0" at the edge of the planting hole.

Figure 22A:
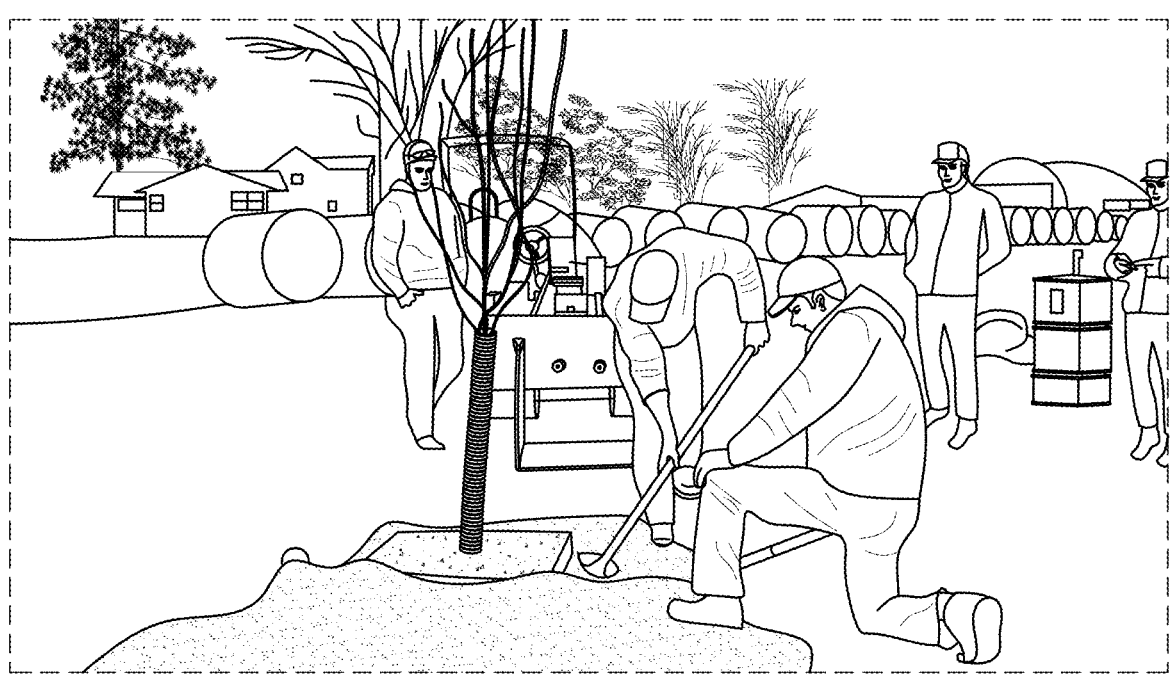
FIG. 22a illustrates leveling a tree with a horizontal root system platform in the hole, in accordance with one embodiment.
Figure 22B:
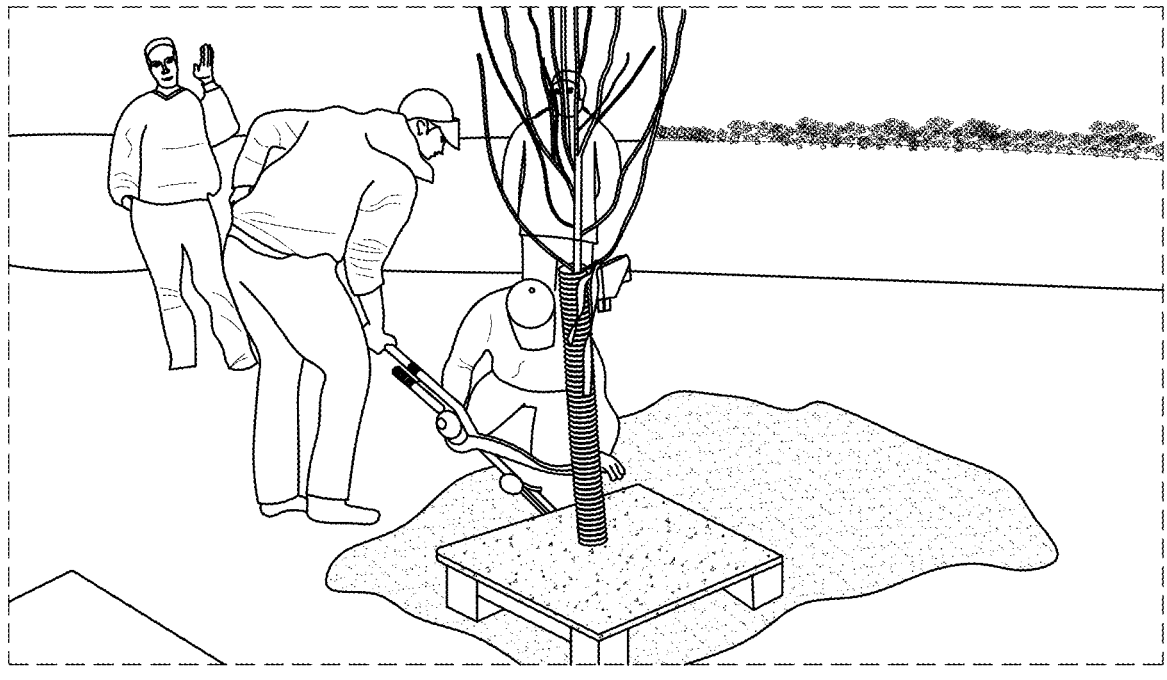
FIG. 22b illustrates leveling a tree with a horizontal root system platform in the hole, in accordance with one embodiment.
Figure 23A:
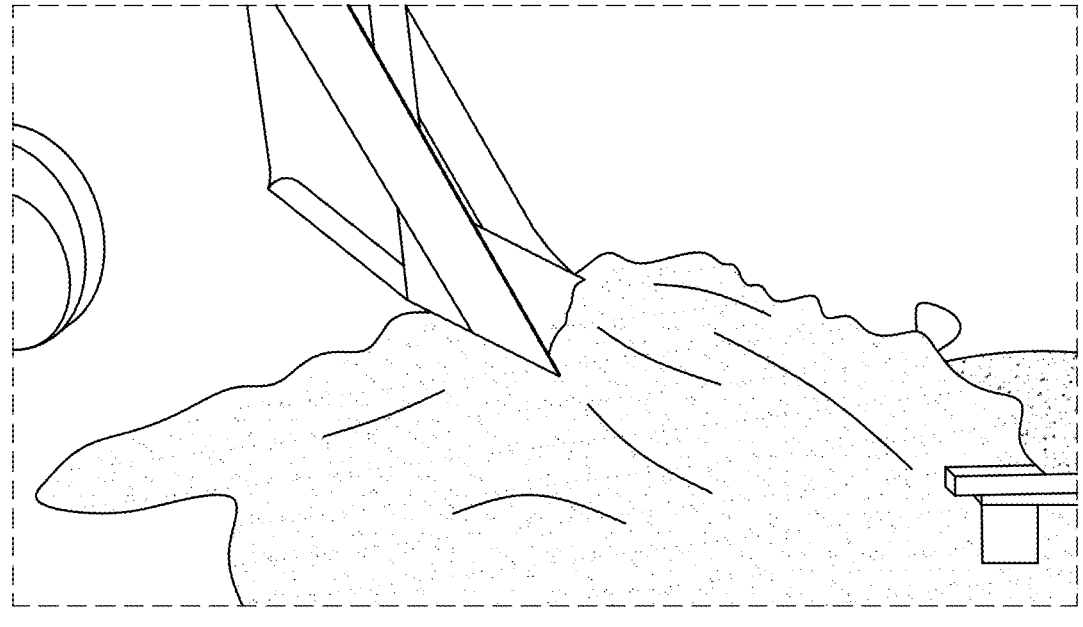
FIG. 23a illustrates back filling the hole with planted tree in a horizontal root system platform using a U-blade, in accordance with one embodiment.
Figure 23B:
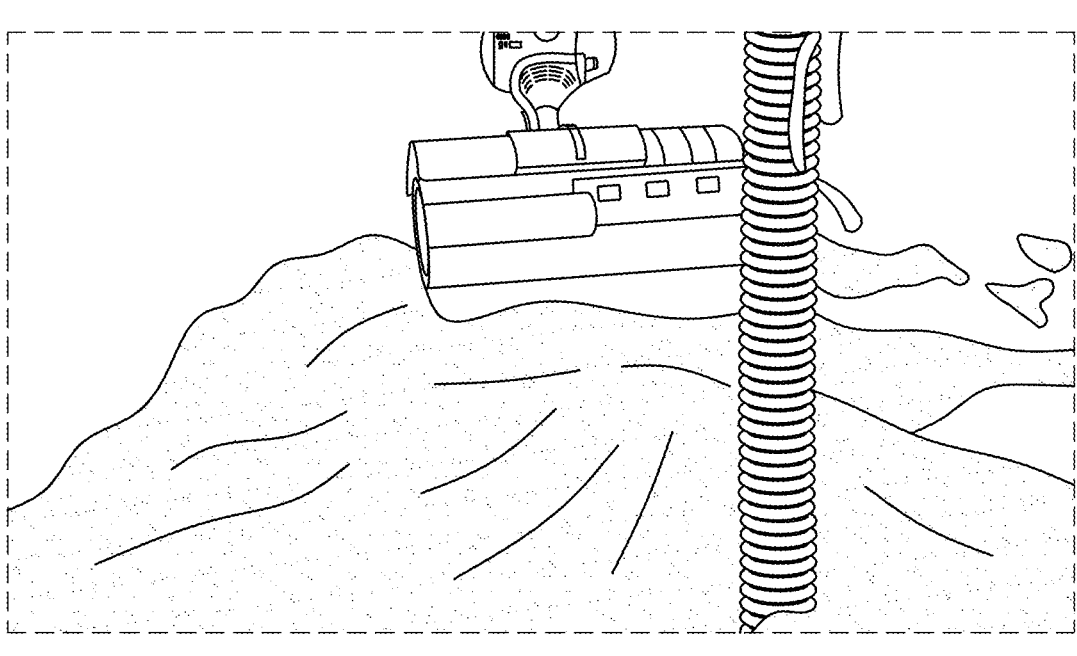
FIG. 23b illustrates finishing the planting area, in accordance with one embodiment.
Figure 24A:
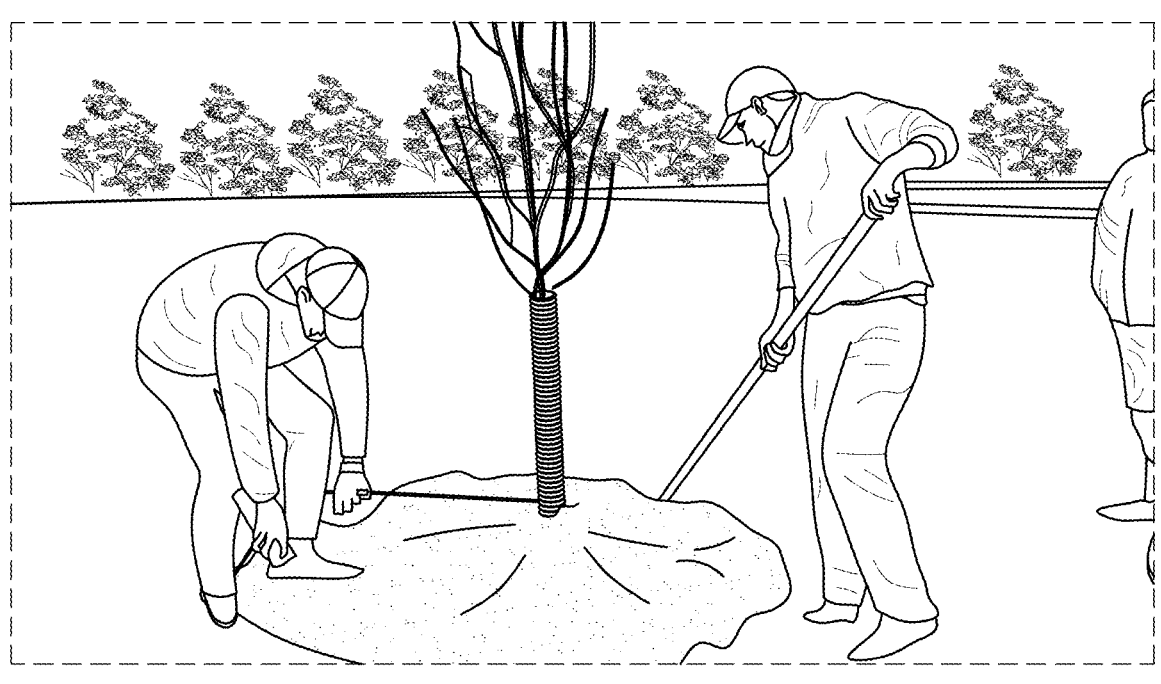
FIG. 24a illustrates marking a radius of the planted tree, in accordance with one embodiment.
Figure 24B:
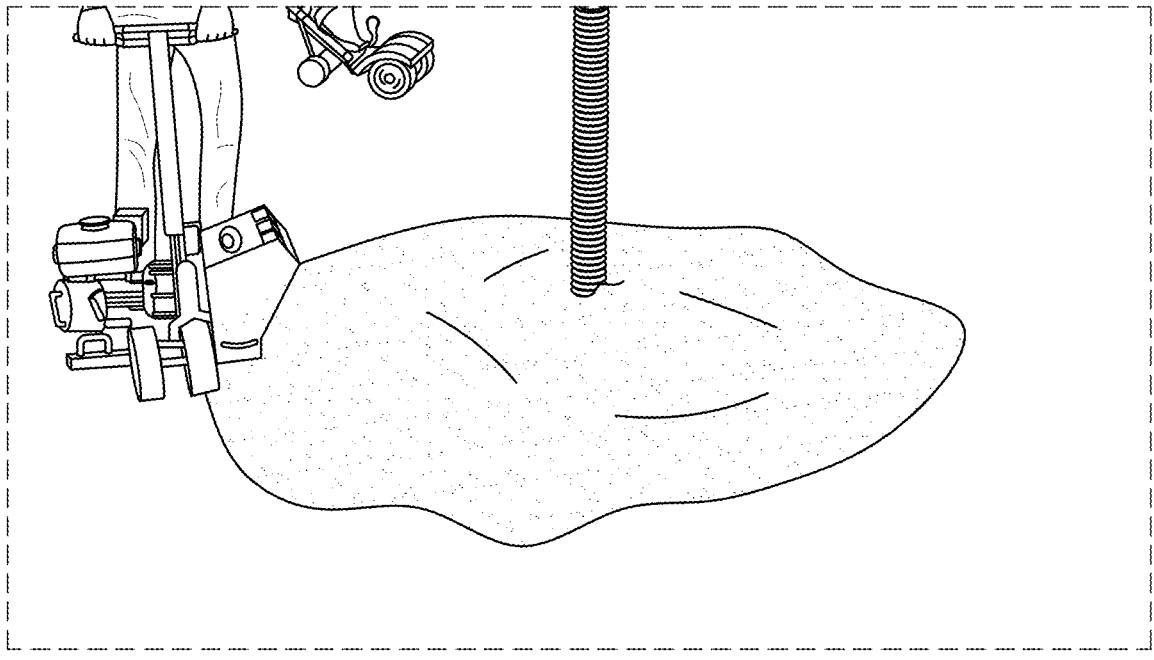
FIG. 24b illustrates cutting the radius of FIG. 24a, in accordance with one embodiment.
Figure 25A:
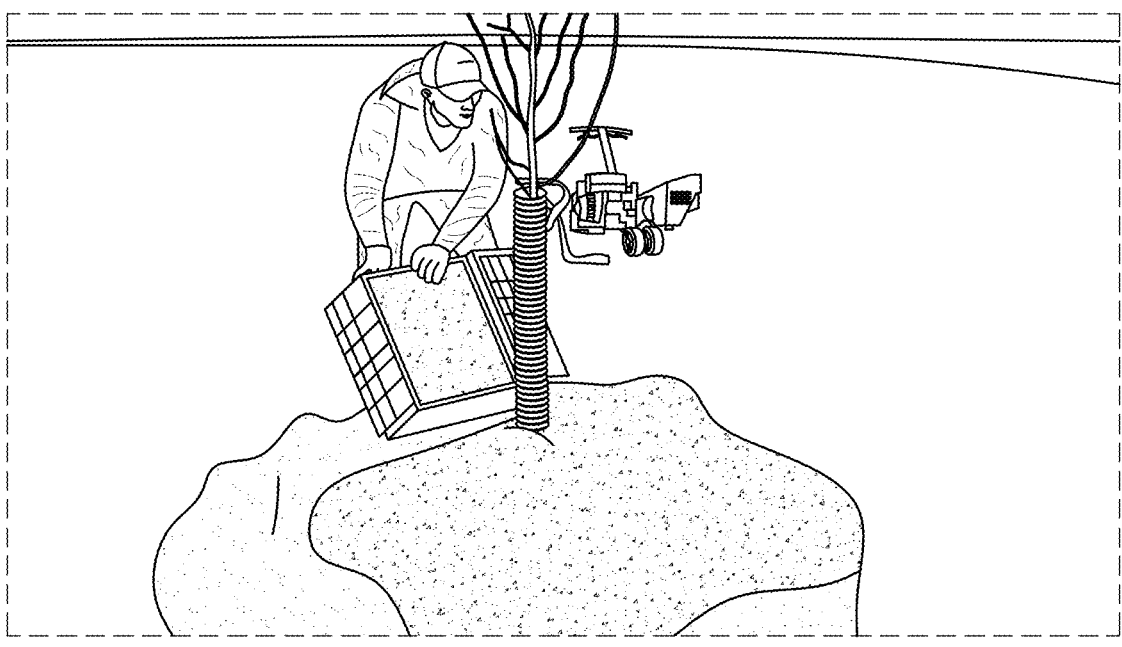
FIG. 25a illustrates a first step of covering dirt of the planting area with mulch, in accordance with one embodiment.
Figure 25B:
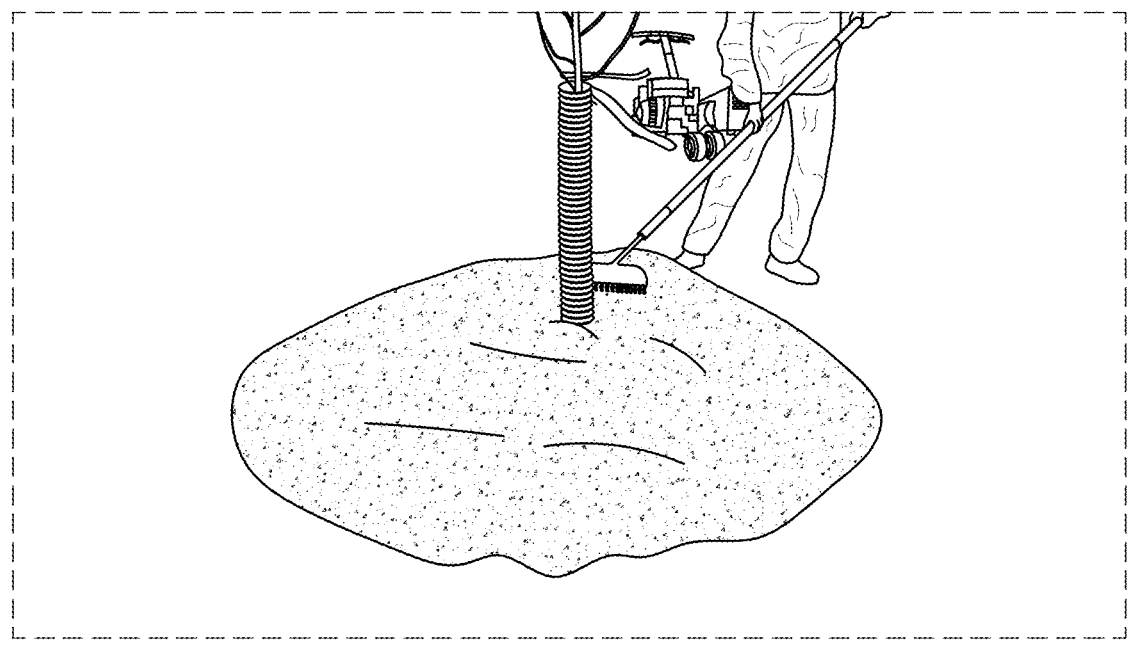
FIG. 25b illustrates a second step of covering dirt of the planting area with mulch, in accordance with one embodiment.

The planter is leveled 116, shown in FIGS. 22*a* and 22*b*, and the hole is back filled with dirt 118, shown in FIGS. 23*a* and 23*b*. The plant area may be then be finished with a paddle broom, such as a Stihl Paddle Broom. By finishing the area with a paddle broom, required raking is reduced, which results in significantly less turf damage than a rake. The radius of the hole is marked and cut 120, for example with an edger, such as shown in FIGS. 24*a* and 24*b*. The area may then be covered with mulch 122, shown in FIGS. 25*a* and 25*b*.

Figure 26:
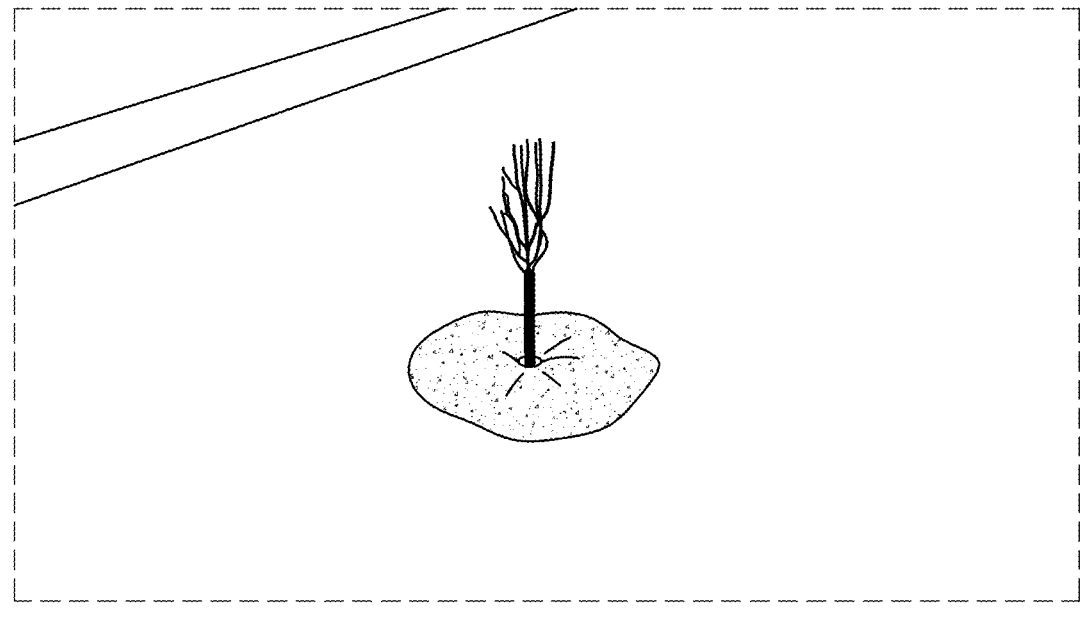
FIG. 26 illustrates a planted tree.

FIG. 26 illustrates a tree as grown using the method of FIG. 14 and planted using the method of FIG. 16.

The system and method further relates to a broader tree planting strategy that encourages applying diversity to tree planting to ensure that the tree legacy lives on for generations. Chestnut Blight, Dutch Elm Disease, and Emerald Ash Borer are classic examples of what can happen when disease or insects invade our communities and take away large numbers of trees. A diversity plan limits the percentage of trees within each Genus to a maximum of 20% of the trees on a property.

The method further encourages avoiding planting all trees on a property at one time. Throughout the year, the trees can be planted from when the frost is out of the soil in the spring through freeze up in the fall which is typically April through November. We do not encourage planting all of the trees on your plan in one season. This is an investment type strategy that encourages property owners to add trees over a series of years to allow the plan to evolve over time as the trees age.

Growth Method

A growth method is described herein to encourage healthy growth of trees planted using the disclosed method. The growth method encourages stewardship of planted trees. The three primary aspects of tree stewardship are juvenile pruning, soil resources, and plant health care. Trees go through three distinct growth phases in their lifetime. Juvenile growth, mature growth, and the final phase of a tree's life that is called senescence are different from a chemical and physical perspective which drives how to treat trees during these phases of life.

The first is the juvenile growth phase, which the tree(s) are experiencing at the time of planting. Using the system and method disclosed herein, the trees typically come from a forested ecosystem. That means that juvenile growth is a rapid explosion of vertical growth to try to outcompete other trees to first claim sunlight above the tree followed by pushing lateral branches out to push competing trees away on all sides. In the tree's natural forest ecosystem shade from competing trees actually prune the juvenile tree and helps it with proper form early in life.

When trees are planted in accordance with a planned spacing, they lack this natural pruning system. Ignoring the juvenile growth phase allows structural defects to grow beyond the point of correction and that leads to massive structural failures when the tree becomes mature. Nearly all major structural storm damage to trees caused by dynamic loading from wind, snow, and ice is in the first 20 feet from the ground into the canopy. These structural defects could have been corrected by a trained arborist from the ground during the juvenile growth phase following planting with 3 to 5 pruning cuts every 2 years until the tree shifts into its mature growth phase. This commitment to a juvenile training pruning program following planting will ensure that your properly planted trees will have the right structural branching to ensure the investment in new trees will allow them to become mature specimens.

Accordingly, to substantially prevent structural defects during the juvenile growth phase, the growth method encourages a minimum of 3 prunings within the first 5 years.

This commitment to a juvenile training pruning program following planting ensures that properly planted trees will have the proper structural branching. The growth method may further recommend treating juvenile trees during their establishment period with periodic pesticide applications.

Soil resources can limit root growth. Trees need a root system that extends five times the height of a tree in all directions in the upper six to eight inches of soil. That means that a fifteen foot tall shade tree that was just planted needs a root system that radiates seventy five feet in all directions. As the roots of the tree grow beyond the package in which it arrived, they arrived in at your property they need water, nutrients, and oxygen to colonize the soil. All soils need nitrogen to support plant growth. Low fertility soils also need inputs of phosphorus and potassium as well. The growth method may include developing a stewardship program with a fertility strategy to ensure a new tree is able to grow in all directions without any barriers due to low fertility areas. This is a juvenile growth phase treatment for all trees and with some species may be extended into the mature growth phase as well. Laboratory soil testing may be done to determine nutrient levels and determine the best fertility strategy. That being said, in general, the most important nutrient is nitrogen and it is not possible to test for nitrogen. Soil cannot store nitrogen for long periods of time. Accordingly, the method recommends adding add nitrogen fertilizer to the site on an annual basis. The soil type is the most important factor in water retention and fertility—clay soils with fine particles hold nutrient extremely well and typically are moist in normal conditions whereas sandy soils with large particle sizes have little ability to retain nutrients or water. Wood/bark mulch is the single biggest player in mitigating soil moisture and nutrients. 400% more root growth occurs under mulch compared to turf grass areas and the mulch serves as a slow release nutrient reservoir as it slowly decays releasing valuable macro and micro nutrients.

The final aspect of the growth method area of the stewardship program is plant health care or PHC. This addresses all aspects of tree health and may, in some instances, provide assistance particularly when the tree is young. During the juvenile growth phase the tree allocates tremendous amounts of energy to rapid vegetative growth above ground as the very survival of the tree depends on outcompeting its neighbors to claim sunlight or it will die. Due to this resource allocation to growth there are times when the tree lacks sufficient energy for defense against disease insect pests. An example is Japanese Beetle damage to leave on Linden or Basswood trees within the genus *Tilia*. Prior to Emerald Ash Borer taking out the entire genus *Fraxinus*, it may have been recommended leaving *Tilia* off of a planting plan. The disclosed method uses an underlying assumption that all available genera are needed to support the diversity strategy. This means that the growth method may require treatment of juvenile trees in particular during their establishment period with periodic pesticide applications.

The overall goal of stewardship is to help each tree become established. The growth method thus includes matching the tree to the microsite and providing proper root system orientation at planting followed by training pruning, fertility management, and PHC.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A horizontal root system planter for receiving a plant, the planter comprising:

a base structure, wherein the base structure has a length, a width, a perimeter, and an area; and;

a flexible wall extending upwardly from the base structure and defining at least a portion of both an exterior and interior surface of the planter, wherein the wall has a height that is less than half the length of the base structure; the wall extending substantially around the base structure at or adjacent the perimeter, wherein the base structure and the wall define a space for roots of the plant to grow; and wherein the length of the base structure and the height of the wall are configured to encourage the roots to grow radially outwardly and not substantially downwardly, causing root tips to grow towards the wall, and wherein the flexible wall is configured to trap and cause the death of the root tips therein, and produce lateral roots behind the dead root tip.

2. The planter of claim 1, wherein the wall has a height of no greater than 12 inches.

3. The planter of claim 1, wherein the base structure includes a base substructure and a frame, wherein the base substructure comprises a deck and support members.

4. The planter of claim 3, wherein the wall is provided within the frame.

5. The planter of claim 1, wherein the wall extends along a perimeter of the base structure.

6. The planter of claim 1, wherein the wall includes a plurality of pockets engineered into the panels, the pockets are configured to trap tree roots therein.

7. The planter of claim 1, wherein the wall is removably affixed to the base structure and is configured to be removed before the plant is planted in the ground.

8. The planter of claim 7, wherein the wall is configured to be reusable.

9. The planter of claim 1, wherein the base structure has a deck comprising a plurality of boards, each board having a first end and a second end.

10. The planter of claim 9, wherein the deck includes a first support piece extending along the first ends of the boards and a second support piece extending along the second ends of the boards.

11. The planter of claim 9, wherein the deck covers a majority of the area of the base structure.

12. The planter of claim 9, wherein the wall is biodegradable.

13. The planter of claim 9, wherein the deck further includes an upwardly extending frame and the wall is attached to the upwardly extending frame.

14. The planter of claim 9, wherein the deck further includes an upwardly extending frame comprising two or more corner posts.

15. The planter of claim 14, wherein the upwardly extending frame comprises first, second, third, and fourth corner posts and first, second, third, and fourth upper members, wherein the first upper member extends between the first and second corner posts, the second upper member extends between the second and third corner posts, the third upper member extends between third and fourth corner posts, and the fourth upper member extends between fourth and first corner posts.

16. The planter of claim 15, further comprising first and second laterally extending members, wherein the first laterally extending member extends colinearly with the first upper member and the second laterally extending member extends colinearly with the third laterally extending member.

17. The planter of claim 9, wherein the wall extends upwardly from the base structure perpendicular to the deck.

18. A horizontal root system planter for receiving a plant, the planter comprising:

a base structure configured to support the plant when the plant is planted in the ground, wherein the base structure has a length, a width, a perimeter, and an area; and;

a flexible wall extending upwardly from and perpendicular to the base structure, the wall defining at least a portion of an exterior surface of the planter the wall extending substantially around the base structure at or adjacent the perimeter, wherein the wall has a height that no greater than 12 inches and less than half the length of the base structure, wherein the wall is removable from the base structure;

wherein the base structure and the wall define a space for roots of the plant to grow; and wherein the length of the base structure and the height of the wall are configured to encourage the roots to grow radially outwardly and not substantially downwardly, causing root tips to grow towards the wall, and wherein the flexible wall is configured to trap and cause the death of the root tips therein.

19. The horizontal root system planter of claim 18, wherein the wall includes a plurality of pockets engineered into the panels, the pockets are configured to trap tree roots therein.

20. A system for growing a plant, the system comprising:

(a) a horizontal root system planter for receiving a plant, the planter comprising;

a base structure, wherein the base structure has a length, a width, and an area; and;

a flexible wall extending upwardly from the base structure and defining at least a portion of an exterior and interior surface of the planter, wherein the wall has a height that is less than half the length of the base structure and wherein the wall has a height of no greater than 12 inches, wherein the base structure and the wall define a space for roots of the plant to grow; and wherein the length of the base structure and the height of the wall are configured to encourage the roots to grow radially outwardly and not substantially downwardly, causing root tips to grow towards the wall, and wherein the flexible wall is configured to trap and cause the death of the root tips therein and produce lateral roots behind the dead root tip, and wherein wall includes a plurality of pockets engineered into the panels, the pockets are configured to trap tree roots therein;

(b) a tip tray configured for transporting the horizontal root system in a tipped orientation, the tip tray including a platform configured to accept the base structure; and (c) a planting tool comprising a box and a blade, the blade including a support surface configured to accept the base structure.

* * * * *